US012791072B2

(12) United States Patent
Tang et al.

(10) Patent No.: US 12,791,072 B2
(45) Date of Patent: Nov. 10, 2026

(54) COMPOSITE PREFORMS

(71) Applicant: Honeywell International Inc., Charlotte, NC (US)

(72) Inventors: Long Gui Tang, Granger, IN (US); Mark C. James, Plymouth, IN (US); Neil Murdie, Granger, IN (US); Jenn Yeu Nieh, St. Joseph, MI (US)

(73) Assignee: Honeywell International Inc., Charlotte, NC (US)

( * ) Notice: Subject to any disclaimer, the term of this patent is extended or adjusted under 35 U.S.C. 154(b) by 323 days.

(21) Appl. No.: 18/504,900

(22) Filed: Nov. 8, 2023

(65) Prior Publication Data

US 2025/0146550 A1 May 8, 2025

(51) Int. Cl.
*F16D 69/02* (2006.01)
*B29C 70/20* (2006.01)
(Continued)

(52) U.S. Cl.
CPC .......... *F16D 69/023* (2013.01); *B29C 70/207* (2013.01); *C04B 35/64* (2013.01);
(Continued)

(58) Field of Classification Search
CPC ......... F16D 69/023; F16D 65/123–126; F16D 2065/1308; F16D 2065/132;
(Continued)

(56) References Cited

U.S. PATENT DOCUMENTS 5,388,320 A * 2/1995 Smith ...................... D04H 3/10 28/107
5,546,880 A 8/1996 Ronyak et al.
(Continued)

FOREIGN PATENT DOCUMENTS

CN 204715011 U 10/2015
CN 110862266 A 3/2020
(Continued)

OTHER PUBLICATIONS

Extended Search Report from counterpart European Application No. 24208486.1 dated Apr. 7, 2025, 9 pp.
(Continued)

*Primary Examiner* — Christopher P Schwartz
(74) *Attorney, Agent, or Firm* — Shumaker & Sieffert, P.A.

(57) ABSTRACT

A preform for a composite may include a plurality of fibrous layers consolidated together and forming the preform extending along a longitudinal axis. The plurality of fibrous layers includes at least one first fibrous layer and at least one second fibrous layer. The at least one first fibrous layer includes a plurality of first segments, and the least one second fibrous layer includes a plurality of second segments. At least one first segment of the plurality of first segments includes a plurality of reinforcing fibers extending at an angle $-\alpha$ relative to a radial direction extending from the longitudinal axis. At least one second segment of the plurality of second segments includes a plurality of reinforcing fibers extending at an angle $+\alpha$ relative to the radial direction. $\alpha$ is greater than 0° and less than 90°.

20 Claims, 11 Drawing Sheets

(51) Int. Cl.

| | |
|---|---|
| ***C04B 35/64*** | (2006.01) |
| ***C04B 35/83*** | (2006.01) |
| ***F16D 65/12*** | (2006.01) |
| *B29K 105/08* | (2006.01) |
| *B29K 307/04* | (2006.01) |
| *B29L 31/16* | (2006.01) |
| *F16D 65/02* | (2006.01) |
| *F16D 69/00* | (2006.01) |

(52) U.S. Cl.

CPC ............ *C04B 35/83* (2013.01); *F16D 65/126* (2013.01); *B29K 2105/0881* (2013.01); *B29K 2307/04* (2013.01); *B29L 2031/16* (2013.01); *C04B 2235/422* (2013.01); *C04B 2235/5248* (2013.01); *C04B 2235/5256* (2013.01); *F16D 2065/1308* (2013.01); *F16D 2065/132* (2013.01); *F16D 2069/005* (2013.01); *F16D 2200/0047* (2013.01); *F16D 2200/0091* (2013.01); *F16D 2250/0023* (2013.01)

(58) Field of Classification Search

CPC ....... F16D 2069/005; F16D 2200/0047; F16D 2200/0091; F16D 2250/0023; B29C 70/207; C04B 35/64; C04B 35/83; C04B 2235/422; C04B 2235/5248; C04B 2235/5256; B29K 2105/0881; B29K 2307/04; B29L 2031/16

USPC ................... 188/218 XL; 29/419.1; 428/64.1

See application file for complete search history.

(56) References Cited

U.S. PATENT DOCUMENTS

| | | | | |
|---|---|---|---|---|
| 5,688,577 A | | 11/1997 | Smith et al. | |
| 6,641,893 B1 | * | 11/2003 | Suresh | C04B 41/86 428/113 |
| 6,660,355 B2 | * | 12/2003 | Johnson | F16D 69/023 442/388 |
| 8,060,997 B2 | | 11/2011 | Wall, III et al. | |
| 10,202,715 B2 | * | 2/2019 | Miao | D04H 1/46 |
| 10,746,246 B2 | | 8/2020 | Fryska et al. | |
| 10,830,297 B2 | | 11/2020 | Lu et al. | |
| 11,215,250 B2 | * | 1/2022 | Cividini | C04B 35/83 |
| 12,117,060 B2 | | 10/2024 | Linck | |
| 12,343,944 B2 | * | 7/2025 | Hamlyn | D04H 18/02 |
| 2004/0074075 A1 | * | 4/2004 | James | C04B 35/83 29/419.1 |
| 2020/0061964 A1 | * | 2/2020 | Fryska | B32B 3/18 |
| 2020/0063812 A1 | * | 2/2020 | Fryska | C04B 35/52 |

FOREIGN PATENT DOCUMENTS

| | | | |
|---|---|---|---|
| EP | 1568911 | A1 | 8/2005 |
| EP | 3211262 | A2 | 8/2017 |
| EP | 3616899 | A1 | 3/2020 |
| EP | 3616901 | A1 | 3/2020 |
| EP | 4183568 | A1 | 5/2023 |
| KR | 200420515 | Y1 | 7/2006 |
| WO | 02081942 | A1 | 10/2002 |

OTHER PUBLICATIONS

Response to Extended Search Report dated Apr. 7, 2025, from counterpart European Application No. 24208486.1 filed Oct. 24, 2025, 41 pp.

"What is the Effect of Fiber Orientation on Carbon Fiber Composites?" https://www.nitprocomposites.com/blog/what-is-the-effect-of-fiber-orientation-on-carbon-fiber-composites, retrieved on Sep. 10, 2025, 6 pp.

Gadow et al., "Carbon fiberreinforced carbon composites for aircraft brakes", American Ceramic Society Bulletin, vol. 98, No. 6, Aug. 2019, pp. 28-34.

* cited by examiner

COMPOSITE PREFORMS

TECHNICAL FIELD

The present disclosure relates to preforms for composite articles, for example, composite articles used in brake friction articles.

BACKGROUND

Carbon fiber-reinforced carbon materials, also referred to as carbon-carbon composite materials, are composite materials that include carbon fibers reinforced in a matrix of carbon material. Carbon-carbon composite components can be used in many high temperature applications. For example, the aerospace industry employs carbon-carbon composite components as friction materials for commercial and military aircraft, such as brake friction materials.

SUMMARY

In general, the disclosure describes a composite preform that includes a plurality of layers including reinforcing fibers, and systems and techniques for forming composite preforms.

In some examples, the disclosure describes a preform for a composite. The composite may include a plurality of fibrous layers consolidated together and forming the preform extending along a longitudinal axis. The plurality of fibrous layers includes at least one first fibrous layer and at least one second fibrous layer. The at least one first fibrous layer includes a plurality of first segments, and the least one second fibrous layer includes a plurality of second segments. At least one first segment of the plurality of first segments includes a plurality of reinforcing fibers extending at an angle $-\alpha$ relative to a radial direction extending from the longitudinal axis. At least one second segment of the plurality of second segments includes a plurality of reinforcing fibers extending at an angle $+\alpha$ relative to the radial direction. $\alpha$ is greater than 0° and less than 90°.

In some examples, the disclosure describes a method including laying up a plurality of layers including at least one first fibrous layer and at least one second fibrous layer to form a preform extending along a longitudinal axis. The at least one first fibrous layer includes a plurality of first segments, and the least one second fibrous layer including a plurality of second segments. The method further includes consolidating the preform. At least one first segment of the plurality of first segments includes a plurality of reinforcing fibers extending at an angle $-\alpha$ relative to a radial direction extending from the longitudinal axis. At least one second segment of the plurality of second segments includes a plurality of reinforcing fibers extending at an angle $+\alpha$ relative to the radial direction. $\alpha$ is greater than 0° and less than 90°.

The details of one or more examples are set forth in the accompanying drawings and the description below. Other features, objects, and advantages will be apparent from the description and drawings, and from the claims.

BRIEF DESCRIPTION OF THE FIGURES

The details of one or more examples are set forth in the accompanying drawings and the description below. Other features, objects, and advantages will be apparent from the description and drawings, and from the claims.

DETAILED DESCRIPTION

Figure 1:
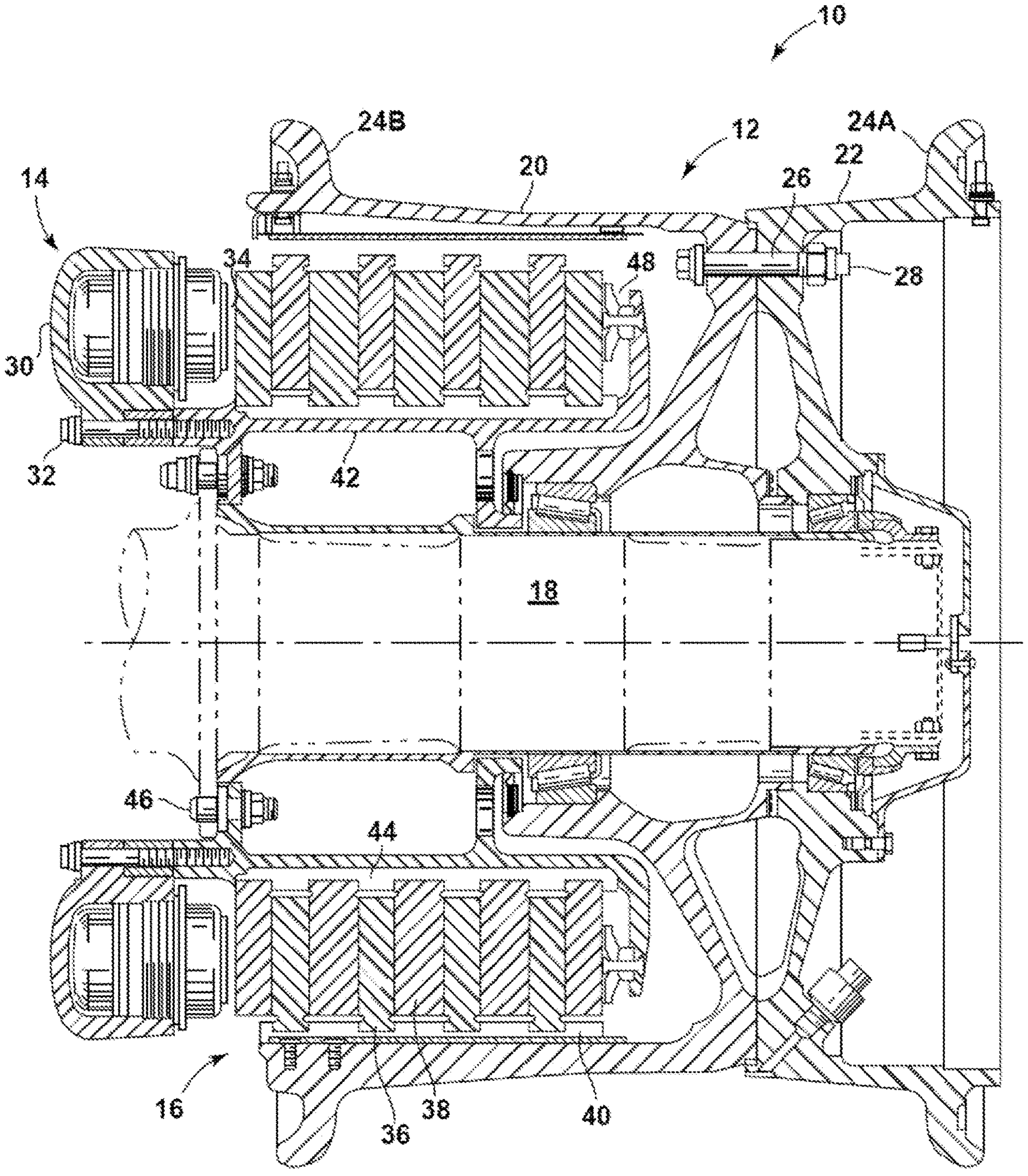
FIG. 1 is a conceptual diagram illustrating an example wheel and brake assembly that may include one or more of disc brakes formed in accordance with the techniques and structural features of this disclosure.

In general, the disclosure describes a composite preform that includes a plurality of layers including reinforcing fibers, and systems and techniques for forming composite preforms.

Brakes, for example, aircraft or other vehicular brakes, may be formed from preforms including reinforcing fibers, for example, carbon fibers. For example, preforms may be densified and/or carbonized to form components of brakes to improve the friction material performance consistency.

A brake may be formed from a composite preform, and the composition and configuration of the preform affects the properties of the brake formed from the preform. One or more of the following preform parameters or configurations, or carbonization techniques may be used to promote strength and uniformity of brake structures, and increase and stabilize the brake dyno performance: controlled fiber orientations in segments, controlled segment layup sequence, a relatively high needled preform density, or free-state (unconstrained) carbonization. In certain examples, brake preforms may include a plurality of layers respectively including disk or arcuate segments including reinforcing fibers. The layers may be consolidated (for example, by needle punching, or by stitching and tufting) to promote intermeshing and reinforcement between layers. The segments may include reinforcing fibers laid or arranged in chordal orientation (reinforcing fibers extending at 90° relative to a radial axis) or in radial orientation (reinforcing fibers extending at 0° or substantially aligned with the radial axis.

Instead of being in chordal or radial orientation, the reinforcing fibers may be oriented at other orientations. In some examples, preforms according to the present disclosure may include segments including reinforcing fibers oriented at an angle greater than 0° or less than 90° relative to the radial direction, for example, at 30°, 45°, 60°, or some other angle.

In some examples, the disclosure describes a preform for a composite. The composite may include a plurality of fibrous layers consolidated together and forming the preform extending along a longitudinal axis. The plurality of fibrous layers includes at least one first fibrous layer and at least one second fibrous layer. The at least one first fibrous layer includes a plurality of first segments, and the least one second fibrous layer includes a plurality of second segments. At least one first segment of the plurality of first segments includes a plurality of reinforcing fibers extending at an angle $+\alpha$ relative to a radial direction extending from the longitudinal axis. At least one second segment of the plurality of second segments includes a plurality of reinforcing fibers extending at an angle $-\alpha$ relative to the radial direction. $\alpha$ is greater than 0° and less than 90°.

Orienting the reinforcing fibers at angles $+\alpha$ and $-\alpha$ (for example, having an absolute magnitude of 45°, 60°, or otherwise greater than 0° and less than) 90° may promote balance in preform structures, and distribute friction forces more evenly during braking. Further, angled reinforcing fibers may promote dissipation of heat generated during braking in a radially outward direction, resulting in relatively lower brake temperatures compared to reinforcing fibers arranged in chordal orientation.

The fibrous layers including segments differing in orientation of reinforcing fibers may be laid up in different layup sequences. For example, a 6:6 layup sequence may include an XXXXXX:YYYYYYY pattern, in which six segments having a first fiber orientation (for example, a negative angle) alternate with six segments having a second fiber orientation (for example, a positive angle).

In some examples, other layup sequences may be used, for example, a 1:1 (XY segment pattern), or a 2:2 (XXYY segment pattern), or some other layup sequence. Using a 1:1 (XY pattern) layup sequence may further promote uniformity and strength in brake structures formed from preforms. The 1:1 layup sequence may form controllable and uniform structures within the friction rubbing zones, compared to chordal segment layers and/or radial segment layers having a 6:6 layup sequence.

In some examples, preforms may be needle-punched with a relatively high needled preform density (for example, greater than 0.60 g/cc, or at least 0.65 g/cc). Such a higher needled preform density may include a larger proportion of fibers extending in a Z-direction (perpendicular to layers), promoting connectivity between layers for higher carbon brake strengths.

In certain techniques, consolidated preforms are carbonized under a constrained condition. For example, a load may be applied to a preform during carbonization. In some examples, consolidated preforms may be carbonized in an unconstrained condition, for example, in the absence of a load. Such unconstrained carbonization may promote free thermal shrinkages during high temperature (for example, over 1600° C.) carbonization under an inert environment. Such unconstrained carbonization may allow the fibers within the preforms having self-controlled or free thermal shrinkages for lower fiber volume fractions (FVF) of the resultant materials, in turn resulting in lower $B_{eff}$, and may provide lower thermal stress residues in the carbonized materials, resulting in lower distortions and higher braking clearance during the braking.

Thus, one or more of reinforcing fiber orientations, layup sequence, needling density, or state of constraint during carbonization described herein may be used to arrive at brake structures that are relatively more uniform, have an increased carbon strength, and have a brake effectiveness in a target range. Further, preforms and techniques according to the present disclosure may also exhibit one or more of predetermined carbon brake dyno performance, relatively higher quality assurance test pass rates, higher carbon yields, reduced carbon scraps, increased productivity, reduced costs, and CO sustainability due to a reduced need to make up or replace out-of-specification articles.

FIG. 1 is a conceptual diagram illustrating an example wheel and brake assembly 10 that may include one or more disc brakes formed in accordance with the techniques and structural features of this disclosure. For ease of description, examples of the disclosure will be described primarily with regard to aircraft brake assemblies formed of C-C composite components. However, the techniques of this disclosure may be used to form composite components other than aircraft brake discs, and composite components other than carbon composites. For example, the composite components may be used as friction materials in other types of braking applications and vehicles, or for any application requiring relatively high strength at a relatively higher temperature or harsher environment (for example, in nose cones or heat exchangers) and the composites may include reinforcing fibers other than carbon fibers.

In the example of FIG. 1, wheel and brake assembly 10 includes a wheel 12, an actuator assembly 14, a brake stack 16, and an axle 18. Wheel 12 includes wheel hub 20, wheel outrigger flange 22, bead seats 24A and 24B, lug bolt 26, and lug nut 28. Actuator assembly 14 includes actuator housing 30, actuator housing bolt 32, and ram 34. Brake stack 16 includes alternating rotor brake discs 36 and stator brake discs 38. Rotor brake discs 36 are configured to move relative to stator brake discs 38. Rotor brake discs 36 are mounted to wheel 12, and in particular wheel hub 20, by beam keys 40. Stator brake discs 38 are mounted to axle 18, and in particular torque tube 42, by splines 44. Wheel and brake assembly 10 may support any variety of private, commercial, or military aircraft or other type of vehicle.

Wheel and brake assembly 10 includes wheel 12, which in the example of FIG. 1 is defined by a wheel hub 20 and a wheel outrigger flange 22. Wheel outrigger flange 22 may be mechanically affixed to wheel hub 20 by lug bolts 26 and lug nuts 28. Wheel 12 defines bead seals 24A and 24B. During assembly, an inflatable tire (not shown) may be placed over wheel hub 20 and secured on an opposite side by wheel outrigger flange 22. Thereafter, lug nuts 28 can be tightened on lug bolts 26, and the inflatable tire can be inflated with bead seals 24A and 24B providing a hermetic seal for the inflatable tire.

Wheel and brake assembly 10 may be mounted to a vehicle via torque tube 42 and axle 18. In the example of FIG. 1, torque tube 42 is affixed to axle 18 by a plurality of bolts 46. Torque tube 42 supports actuator assembly 14 and stator brake discs 38. Axle 18 may be mounted on a strut of a landing gear (not shown) or other suitable component of the vehicle to connect wheel and brake assembly 10 to the vehicle.

During operation of the vehicle, braking may be necessary from time to time, such as during landing and taxiing procedures of an aircraft. Wheel and brake assembly 10 is configured to provide a braking function to the vehicle via actuator assembly 14 and brake stack 16. Actuator assembly 14 includes actuator housing 30 and ram 34. Actuator assembly 14 may include different types of actuators such as one or more of, e.g., an electrical-mechanical actuator, a hydraulic actuator, a pneumatic actuator, or the like. During operation, ram 34 may extend away from actuator housing 30 to axially compress brake stack 16 against compression point 48 for braking.

Brake stack 16 includes alternating rotor brake discs 36 and stator brake discs 38. Rotor brake discs 36 are mounted to wheel hub 20 for common rotation by beam keys 40. Stator brake discs 38 are mounted to torque tube 42 by splines 44. In the example of FIG. 1, brake stack 16 includes four rotors (rotor brake discs 36) and five stators (stator brake discs 38). However, a different number of rotors and/or stators may be included in brake stack 16 in other examples.

Rotor brake discs 36 and stator brake discs 38 may provide opposing friction surfaces for braking an aircraft. As kinetic energy of a moving aircraft is transferred into thermal energy in brake stack 16, temperatures may rapidly increase in brake stack 16. As such, rotor brake discs 36 and stator brake discs 38 that form brake stack 16 may include robust, thermally stable materials capable of operating at very high temperatures.

In one example, rotor brake discs 36 and/or stator brake discs 38 are formed as a composite (for example, a C-C composite) in the form of an annulus that defines a set of opposing wear surfaces. The composite may be fabricated using any suitable manufacturing technique or combination of techniques including, for example, vacuum pressure infiltration (VPI), resin transfer molding (RTM), chemical vapor infiltration (CVI), chemical vapor deposition (CVD), additive manufacturing, mechanical machining, ablation techniques, or the like using the fiber preforms describe herein as the starting substrate.

As briefly noted, in some examples, rotor brake discs 36 and stator brake discs 38 may be mounted in wheel and brake assembly 10 by beam keys 40 and splines 44, respectively. In some examples, beam keys 40 may be circumferentially spaced about an inner portion of wheel hub 20. Beam keys 40 may, for example, be shaped with opposing ends (e.g., opposite sides of a rectangular) and may have one end mechanically affixed to an inner portion of wheel hub 20 and an opposite end mechanically affixed to an outer portion of wheel hub 20. Beam keys 40 may be integrally formed with wheel hub 20 or may be separate from and mechanically affixed to wheel hub 20, e.g., to provide a thermal barrier between rotor brake discs 36 and wheel hub 20. Toward that end, in different examples, wheel and brake assembly 10 may include a heat shield (not shown) that extends out radially and outwardly surrounds brake stack 16, e.g., to limit thermal transfer between brake stack 16 and wheel 12.

In some examples, splines 44 may be circumferentially spaced about an outer portion of torque tube 42. As such, stator brake discs 38 may include a plurality of radially inwardly disposed lug notches along an inner diameter of the brake disc configured to engage with splines 44. Similarly, rotor brake discs 36 may include a plurality of radially inwardly disposed lug notches along an outer diameter of the brake disc configured to engage with beam keys 40. As such rotor brake discs 36 will rotate with the motion of the wheel while stator brake discs 38 remain stationary allowing the friction surfaces of an adjacent stator brake disc 38 and rotor brake disc 36 to engage with one another to deaccelerate the rotation of wheel 12.

Figure 2:
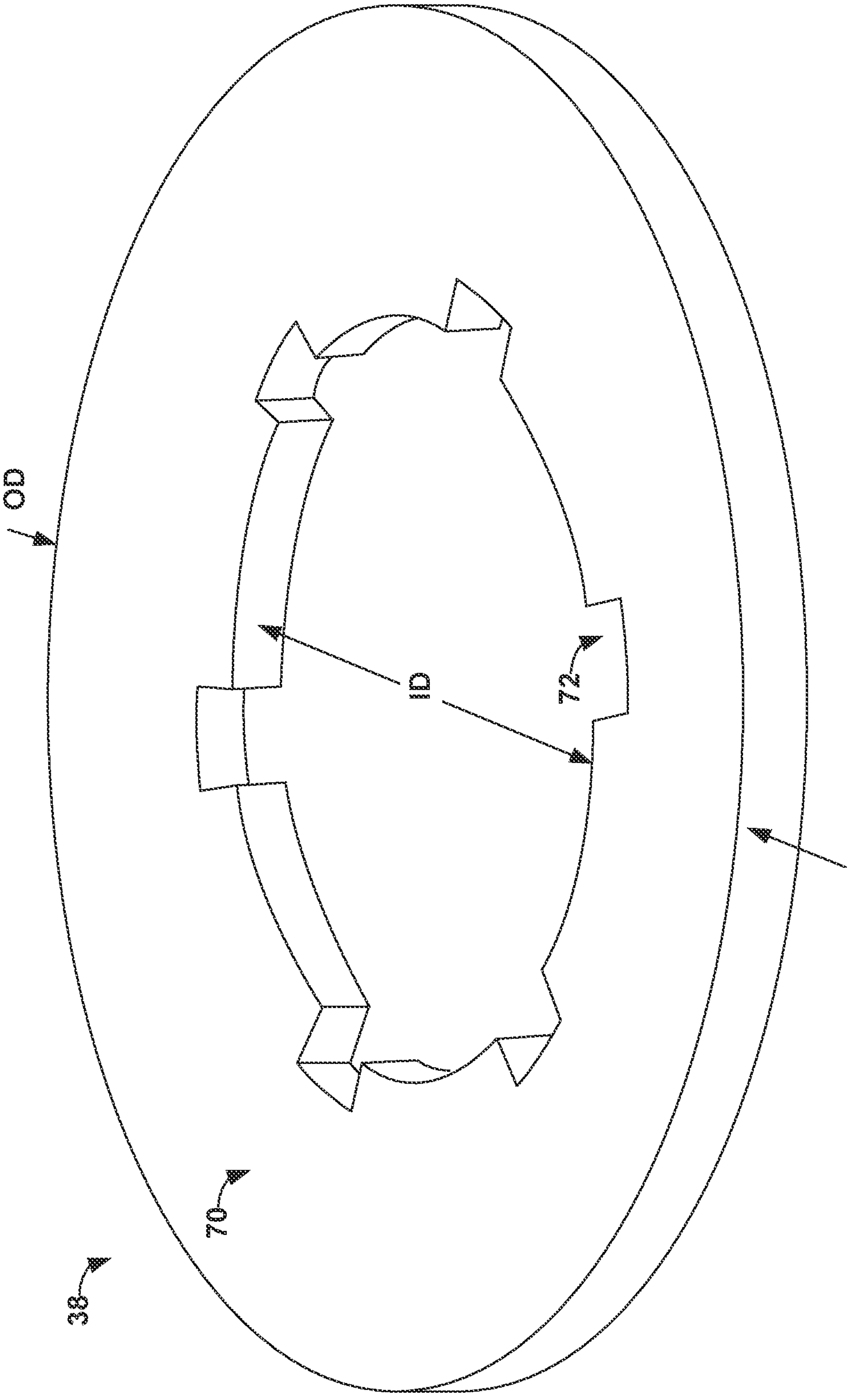
FIG. 2 is a schematic perspective view of an example stator brake disc that defines both an inner diameter (ID) and an outer diameter (OD).

FIG. 2 is a schematic perspective view of an example stator brake disc 38 that defines both an inner diameter (ID) and an outer diameter (OD). Stator brake disc 38 includes opposing friction surfaces 70 positioned on opposite sides of the annulus. Along the inner diameter, stator brake disc 38 may include a plurality of lug notches 72 cut into the body 72 stator brake disc 38 along the inner perimeter configured to engage and interlink with splines 44 of wheel and brake assembly 10. For a rotor disc brake 36, lug notches 72 would occur along the outer diameter of the annulus and configured to engage and interlink with beam keys 40.

During a braking procedure, splines 44 and beam keys 40 may engage with the respective lug notches 72 of rotor and stator brakes discs 36 and 38 transferring a large amount of torque into the brake discs. As described further below, the torque forces created during the braking procedure may be transferred into the underlying fiber architecture of the composite. As described further below, if the fibers of the composite are oriented in a radial arrangement, the resultant forces may be exerted in a direction generally perpendicular to the longitudinal length of the fibers. In contrast, if the fibers are oriented in a chordal (tangential) arrangement (e.g., aligned perpendicular to the radius) or radial arrangement (e.g., aligned with the radius), the resultant forces may be exerted in a direction generally along the longitudinal length of the fibers. The resulting arrangements may result in either a bending or a compressive force being exerted on the underlying fibers within the composite, neither of which are optimal for purposes of strengthening the resultant composite disc brake.

As discussed further below, the fiber performs described herein, which may be used to form rotor and stator brake discs 36 and 38, may include fiber architectures that tailor orientation of the fiber within specified regions of rotor or stator disc brakes 36 and 38. In some examples, the orientation of the fibers within the regions of rotor or stator disc brakes 36 and 38 may ultimately define lug notches 72 to an intermediate angle that may help to improve the resultant torque and strength properties of rotor or stator disc brakes 36 and 38.

Figure 3:
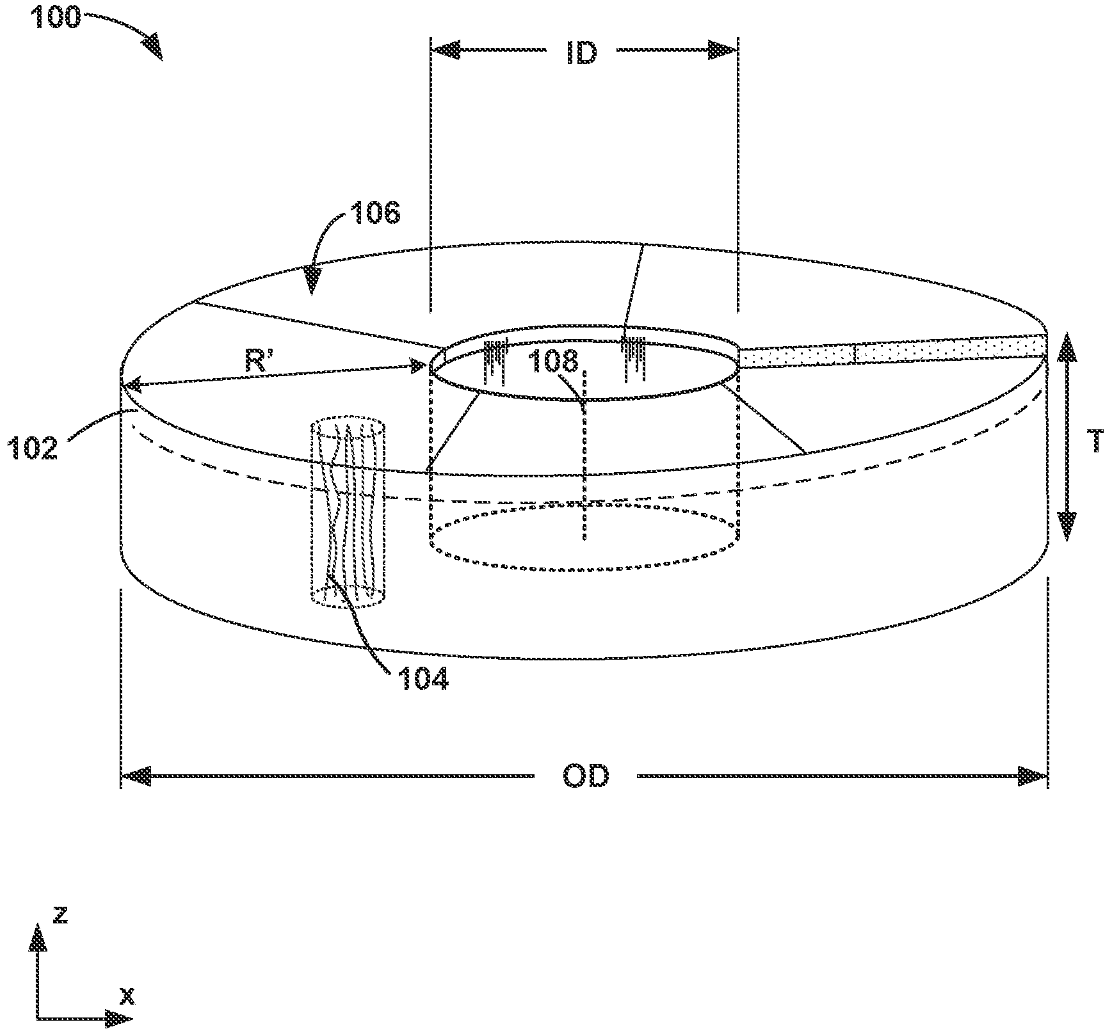
FIG. 3 is a schematic perspective view of an example fibrous preform that may be used to manufacture a densified C-C composites describe herein.

FIG. 3 is a schematic perspective view of an example fibrous preform 100 that may be used to manufacture a densified C-C composites describe herein (e.g., rotor or stator brake discs 36 and 38 of FIGS. 1 and 2). Fibrous preform 100 includes a plurality of superposed fibrous layers 102 (stacked on one another relative to the central axis of the stack) that are consolidated together to form fibrous preform 100 in the shape of an annulus.

The needle-punch process may introduce a plurality of needled fibers 104 into fibrous preform 100 which mechanically bind fibrous layers 102 together. Needled fibers 104 may extend in a general vertical direction (parallel to a Z-axis) aligned with central axis 108 and penetrate into two or more or fibrous layers 102. In some examples, needled fibers 104 may help secure fibrous layers 102 to one another. Additionally, or alternatively, the needle-punch process and resulting needled fibers 104 may partially compress fibrous layers 102 to form a more compacted fibrous preform 100 compared to a stack including a similar number of fibrous layers 102 that have not been consolidated together.

As described further below, each fibrous layer 102 includes a plurality of fabric segments 106 that collectively form a respective layer 102. In some examples, each fibrous layer 102 may be in the form of a planar disc or ring while in other examples each fibrous layer 102 may be non-planar. For example, fibrous preform 100 may be formed by sequentially adding abutting fabric segments 106 in the form of continuous helix about central axis 108. In such examples, each fibrous layer 102 may define a portion of the helix in terms of the number or revolutions about central axis 108. In some examples, each fibrous layer 102 may define about 0.9 to about 1.2 revolutions (e.g., about 325 degrees (°) to about 420°). In examples where a respective fibrous layer 102 defines more than one full revolution of the helix, a portion of the respective fibrous layer 102 may overlap with itself. Despite the overlap, the respective fibrous layer 102 may still be characterized as a single fibrous layer 102 within fibrous preform 100.

While some of the figures described herein show a relatively small number of layers used form the respective fibrous preforms, the preforms (e.g., fibrous preform 100) produced as a result of the techniques describe herein may include any suitable number of fibrous layers 102 (e.g., 30 or more layers) to produce the desired thickness (T) of the resultant preform. In some examples, each fibrous layer 102 may have a thickness as measured in a direction parallel (e.g., parallel or nearly parallel) to central axis 108 of about 1 millimeter (mm) to about 2 mm and the total thickness (T) of fibrous preform 100 when complete may be about 1 inch to about 3 inches (e.g., about 2.5 cm to about 7.6 cm).

In some examples, fibrous preform 100 may be constructed with lug notches 72 (not shown in FIG. 3) formed into either the outer diameter (OD) or inner diameter (ID) depending on whether fibrous preform 100 is intended to be formed as a rotor disc brake 36 or stator disc brake 38 respectively. Lug notches 72 may be prefabricated into fabric segments 106 used to form fibrous preform 100, may be cut into fibrous preform 100 after the respective fibrous layers 102 and fabric segments 106 have all been stacked and consolidated together, or may be introduced after fibrous preform 100 has undergone some or all of the subsequent carbonization and densification procedures to convert fibrous preform 100 into a composite. As described further below, the intended location of lug notches 72 along the inner or outer diameter of fibrous preform 100 may determine the fiber orientation within respective fabric segments 106 depending on whether the respective fabric segments 106 contributes to the inner or outer radial sections of fibrous preform 100.

Fibrous preform 100, once completed, may be in the shape of a disc or annulus defining an outer preform diameter (OD) and inner preform diameter (ID). In some examples, the outer preform diameter (OD) of fibrous preform 100 may be about 14.5 inches (e.g., about 37 cm) to about 25 inches (e.g., about 64 cm) and the inner preform diameter (ID) of fibrous preform 100 may be about 4.5 inches (e.g., about 12 cm) to about 15 inches (e.g., about 38 cm).

Figure 4:
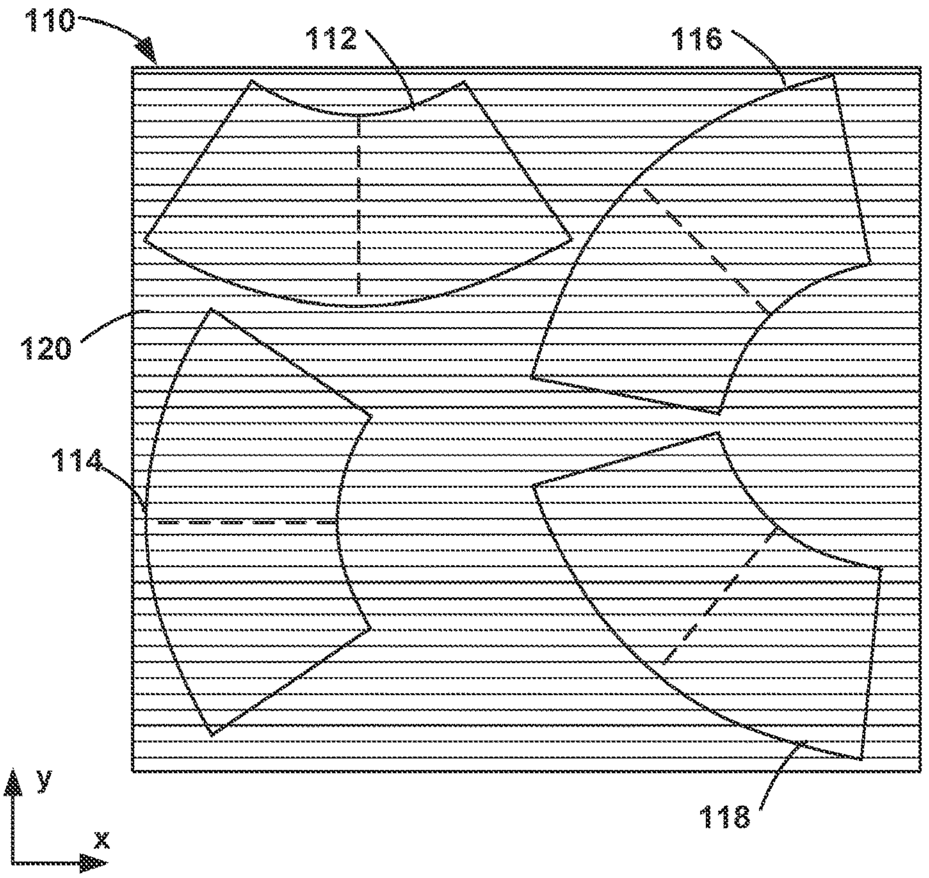
FIG. 4 is a schematic view of an example fabric that may be used to form different types of fabric segments described herein including the fabric segments of the fibrous preform of FIG. 3.

FIG. 4 is a schematic view of an example fabric 110 that may be used to form different types of fabric segments described herein including fabric segments 106 of fibrous preform 100. Fabric 110 includes a plurality of unidirectionally aligned fibers 120, which are shown as being aligned in the x-axis direction of FIG. 4. Fibers 120 may include reinforcing fibers, for example, carbon fibers, fibers configured to subsequently pyrolyze into carbon fibers (hereinafter "carbon-precursor fibers"), or combinations thereof. Carbon-precursor fibers may include, for example, polyacrylonitrile (PAN) fibers, oxidized polyacrylonitrile (O-PAN) fibers, rayon fibers, or the like. In some examples, fibers 120 may include one or more of carbon, boron, ceramic, silica, glass, or any other suitable reinforcing material or precursor.

In some examples, fibers 120 may be in the form of tows (e.g., bundles of individual fibers linearly aligned) of continuous filaments. Each tow may include hundreds to several thousand of individual fibers 120 unidirectionally aligned to form a single tow. In such examples, fabric 110 may include a plurality of unidirectionally aligned tows within the segment with each tow including a plurality of fibers 120.

In some examples, fabric 110 may be a duplex fabric that includes a plurality of unidirectionally aligned fibers 120 (e.g., aligned tows) that have been combined with a plurality of web fibers (not shown). The web fibers may include chopped, discontinuous, or staple fibers having an unspecified alignment that are relatively short in comparison to fibers 120 that, when combined with fibers 120 in a duplex fabric, become intertwined with aligned fibers 120 to impart integrity to fabric 110. The web fibers may define a random fiber orientation relative to each other and to aligned fibers 120.

In some examples, the formation of a duplex fabric may be accomplished by combining one or more layers of aligned tow fibers (e.g., fibers 120) with one or more layers of web fibers that are subsequently consolidated (for example, needle punched or stitched and tufted) into the layer of tow fibers to form duplex fabric. For example, a layer of web fibers may be formed by crosslapping a carded web to achieve a desired areal weight and then needle-punching the layer to form the web layer. Additionally, or alternatively, the web layer may be formed by airlaying the web fibers on top of a layer of the unidirectionally aligned fibers 120. The layer of unidirectionally aligned fibers 120 may be formed by spreading large continuous tows using a creel, to form a sheet of the desired areal weight with fiber 120 being aligned in the same direction. Both the web layer and the layer of unidirectionally aligned fibers 120 may be consolidated together to force the relatively short web fibers to become intertwined with unidirectionally aligned fibers 120 to form the duplex fabric (e.g., fabric 110).

Additionally, or alternatively, fabric 110 may be formed as a duplex fabric by initially incorporating web fibers within the tows of unidirectionally aligned fibers 120. A layer of the described tows may be formed by spreading large the tows using a creel, to form a sheet of the desired areal weight. The layer may then be consolidated (for example, needle-punched or stitched and tufted) to force the relatively short web fibers to become intertwined with unidirectionally aligned fibers 120 thereby forming the duplex fabric.

As a result of the consolidation process in either of the above examples, the web fibers become intertwined with the aligned fibers 120 and help bind aligned fibers 120 together allowing fabric 110 to be efficiently handled without having aligned fibers 120 separate or fall apart with subsequent processing. The resultant duplex fabric (e.g., fabric 110) may be more durable, retain its shape better, and be overall easier to further manufacture compared to a layer of only unidirectionally aligned fibers 120. Other techniques may also be used to form fabric 110 as a duplex fabric that includes both unidirectionally aligned fibers 120 and web fibers which may be known to those skilled in the art. In all the examples described herein, fabric 110 and the fabric segments used to from the fibrous preforms described herein may be composed of one or more layers of a duplex fabric.

In some examples, in addition to holding fabric 110 together, the web fibers used to produce the duplex fabric may ultimately be used to form or contribute to a portion of needled fibers 104 in fibrous preform 100 as a result of fibrous layers 102 being superposed (e.g., stacked on each other) and consolidated together. Additionally, or alternatively, at least some of unidirectionally aligned fibers 120 may be transformed into needled fibers 104 within fibrous preform 100 as a result of fibrous layers 102 being superposed and consolidated together. For example, the needle-punch process may break some of the unidirectionally aligned fibers 120 contained in fabric 110 and at least partially transfer the broken fibers into one or more adjacent fibrous layers 102 within fibrous preform 100 to form needled fibers 104.

Both the web fibers and unidirectionally aligned fibers 120 may be formed of the same fiber or fiber precursor materials, may be formed of different carbon fiber or carbon fiber precursor materials, or may be formed of different combinations of carbon fiber and/or carbon fiber precursor materials. In some examples, fabric 110 may be formed to have an areal fiber weight of the combined web and unidirectionally aligned fibers 120 of about 1250 grams per square meter (g/m$^2$) to about 3000 g/m$^2$ such as, about 1350 g/m$^2$ to about 2000 g/m$^2$.

FIG. 4 illustrates a total of four fabric segments 112-118 being cut from fabric 110 with different types of fiber orientations. Each fabric segment 112-118 may be characterized in terms of its arc angle (φ) and its fiber orientation angle (α), the concepts of which are illustrated in FIG. 5.

Figure 5:
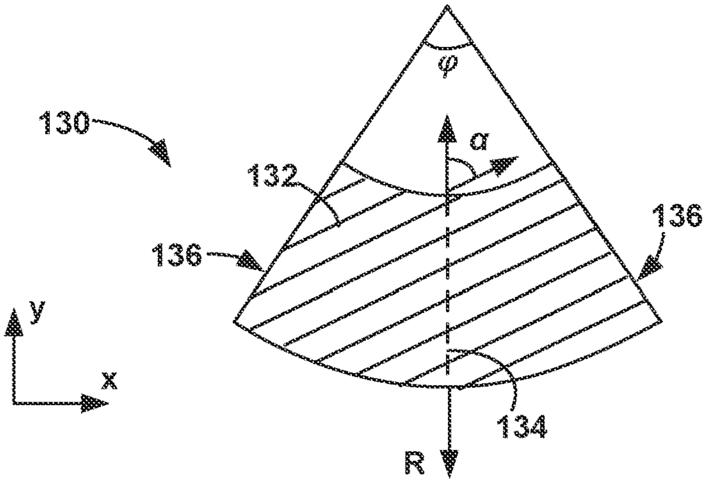
FIG. 5 is a schematic top view of an example fabric segment.

FIG. 5 is a schematic top view of an example fabric segment 130. Fabric segment 130 including unidirectionally aligned fibers 132 may define a segment bisector 134. The segment bisector 134 may represent the center or bisecting line of the arcuate shape of fabric segment 130, and define a radial axis R along which fabric segment 130 extends. The fiber orientation angle (α) represents the angle between segment bisector 134 and the direction in which unidirectionally aligned fibers 132 are aligned. The arc angle (φ) represents the angle between abutting edges 136 of a respective fabric segment 132 and indicates the degree of rotation that a respective fabric segment 132 will occupy within a fibrous layer 102. For example, an arc angle (φ) equal to 360° represents one full revolution about central axis 108 while an arc angle (φ) equal to 45° represents ⅛$^{th}$ of a full revolution about central axis 108.

The fiber orientation angle (α) of the fabric segments described herein may be in a range greater than 0° and less than +90° (e.g., having an absolute magnitude greater than 0° and less than) 90°. For example, referring back to FIG. 4, fabric segment 112 may be characterized as having a fiber orientation angle (α) of 90° because the segment bisector of fabric segment 112 is substantially perpendicular (e.g., perpendicular or nearly perpendicular) to the direction of unidirectionally aligned fibers 120. In some such examples, fabric segment 112 may be referred as having a "tangentially aligned" or "chordal aligned" fiber orientation. Fabric segment 114 may be characterized as having a fiber orientation angle (α) of 0° because the segment bisector of fabric segment 114 is substantially parallel (e.g., parallel or nearly parallel) to the direction of unidirectionally aligned fibers 120. In some such examples, fabric segment 114 may be referred as having a "radially aligned" fiber orientation. Fabric segments 116 and 118 may be characterized as having a fiber orientation angle (α) of either about +45° or about −45° because the segment bisector of fabric segments 116 and 118 are offset from the unidirectionally aligned fibers 120 by about 45°. Fabric segments 116 and 118 may alternatively be oriented to arrive at other fiber orientation angles (α), for example, any angle greater than 0°.

Each fabric segment 112-118 may be obtained from fabric 110 using any suitable technique. In some examples, fabric segment 112-118 may be die cut from fabric 110 with the fiber orientation angle (α) being obtained by adjusting the angle of the die cut relative to the orientation of unidirectionally aligned fibers 120. As will be appreciate by one skilled in the art, fabric segments 116 and 118 may be constructed using the same die cut orientation with the respective fiber orientation angles (α) of either +45° or −45° being obtained by simply flipping a respective fabric segment over (e.g., flipping fabric segment 116 over will produce fabric segment 118). Such understanding likewise holds true for intermediate fiber orientation angles (α) between 0° and 90°. For example, a fabric segment may be formed with a fiber orientation angle (α) of 20°, 25°, 30°, 35°, 40°, 45°, 50°, 55°, 60°, 65°, 70°, 75°, 80°, or 85°, or any other suitable angle. If desired, to obtain a fabric segment having a negative fiber orientation angle (−α), the respective fabric segment may be simply turned over.

In some examples, the fabric segments described herein may define an arc angle (φ) such that, fabric segments forming a single fibrous layer 102 of fibrous preform 100 complete a single full revolution. For example, if a total of six arcuate fabric segments 132 are used to define one complete fibrous layer 102, each fabric segment 132 may define an arc angle (φ) of 60° so that the six fabric segments 132 when aligned with abutting edges 136 (e.g., the edges defining arc angle (φ)) in contact with the abutting edges of adjacent fabric segments 132 will complete one full revolution with each fabric segment occupying ⅙$^{th}$ of the respective fibrous layer 102.

In some examples, the fabric segments described herein may define arc angles (φ) that do not add up to 360° (i.e., one complete revolution) within a fibrous layer 102. For example, fabric segments 106 may be sized so that the plurality of fabric segments 106 within a respective fibrous layer 102 complete more or less than one full rotation within the layer. In some examples, each fabric segment 106 may define arc angle (φ) of about 65° to about 70° (e.g., about) 68°, however, other arc angles (φ) may be used if desired.

In some examples where the respective fabric segments (e.g., fabric segments 106) forming fibrous preform 100 each define an arc angle (φ) of about 65° to about 70°, the respective fibrous layer 102 may complete about 1.08 to about 1.17 revolutions per fibrous layer 102. For example, fabric segments 106 may be sequentially added in a continuing helix pattern. If all the respective fabric segments 106 define an arc angle (φ) of about 68°, the respective fibrous layer 102 may complete about 1.13 revolutions with a small portion of the layer (e.g., about 13%) overlapping itself.

As described further below, setting the arc angle (φ) to about 65° to about 70° (e.g., about) 68° may help to minimize the butt joint overlap of abutting edges 136 between adjacent fibrous layers 102 within the final constructed fibrous preform 100. Additionally, or alternatively, having the arc angle (φ) of about 65° to about 70° (e.g., about) 68° for fabric segments 106 may help to create more uniform alignment of fibers 120 within fibrous preform 100 compared to larger arc angles (φ).

For reasons described further below, different fibrous layers 102 may differ in the magnitude or sign of the fiber orientation angle (α). For example, different layers may have the same or different magnitude, or the same or different sign (+α or −α). The fibrous layers 102 may be arranged in different patterns or sequences or layers, as described with reference to FIGS. 6A to 9.

Figure 6A:
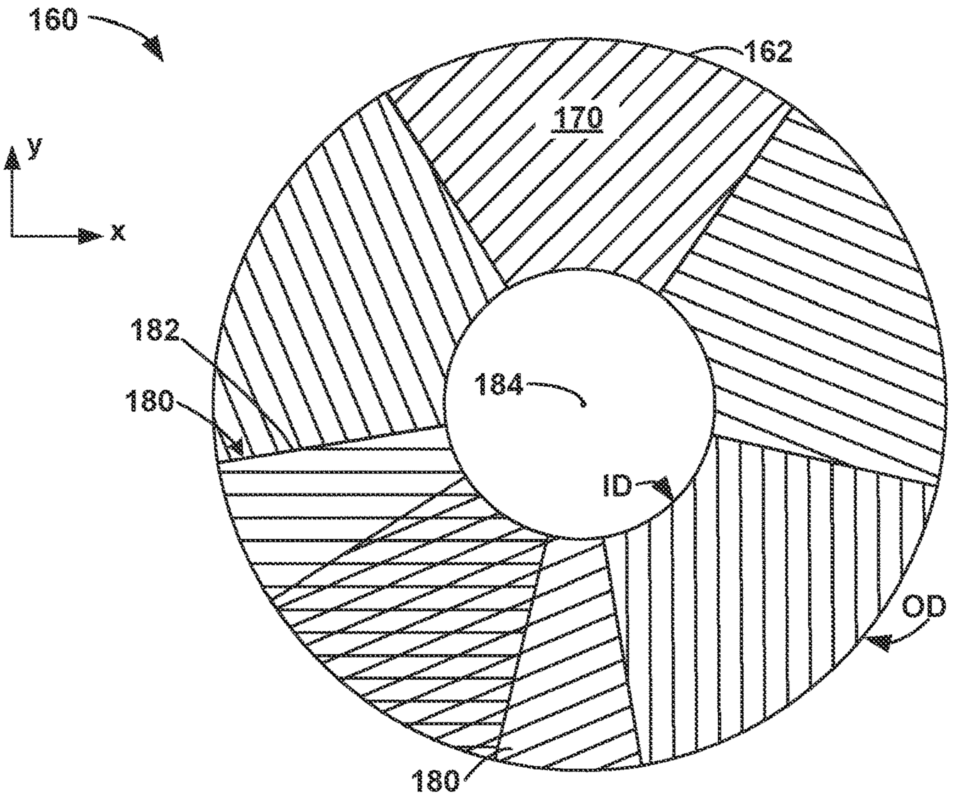
FIG. 6A is a schematic top view of an example preform in a partially formed configuration including a first fibrous layer including a plurality of fabric segments having a positive fiber orientation angle.

FIG. 6A is a schematic top view of an example preform 160 in a partially formed configuration including a first fibrous layer 162 including a plurality of fabric segments 170 having a positive fiber orientation angle. Each fabric segment of the plurality of fabric segments 170 forming first fibrous layer 162 may define a respective arc angle (φ) and fiber orientation angle (α). The arc angles (φ), fiber orientation angles (α) as well as the underlying fabric 110 used to form fabric segments 170 may be substantially the same as those described above with respect to FIGS. 3 to 5 apart from any differences noted below. Additionally, fibrous preform 160 may be substantially the same as fibrous preform 100 apart from any differences noted below. Reinforcing fibers in fabric segments 170 may include one or more of carbon, a carbon precursor, boron, or silica, or any other suitable reinforcing material. The carbon precursor may include an aromatic species.

For example, fabric segments 170 may define the positive fiber orientation angle (α) of about +10° to about +80°, or about +30° to about +60°; or about +40° to about +50°; or about +45°. In the example shown in FIG. 6A, each fabric segment 170 of the first fibrous layer 162 has the same positive fiber orientation angle (α) of 45°.

Each layer 162, or each fabric segment 170 may be uniform in a radial direction. For example, each layer 162 may have a uniform density in a radial direction. Alternatively or additionally, each layer 162 may have a uniform thermal conductivity in a radial direction.

In some examples, by having the fiber orientation angle (α) of the fabric segments 170 be about +10 to +80° (e.g., +45°), unidirectionally aligned fibers 120 within the respective fabric segments 170 may exhibit improved torque strength compared to a fabric segment where unidirectionally aligned fibers 120 within the fabric segment are tangentially or radially aligned (e.g., fabric segments 112 and 114). Further, such a fiber orientation angle (α) may have improved frictional and heat dissipation properties (for example, in a radial direction) compared to tangentially aligned fibers. In other examples, fabric segments 170 may have a negative fiber orientation angle −α, as described with reference to FIG. 7A.

If fibrous preform 160 is being used to construct stator disc brake 38, within a respective fibrous layer 162, all fabric segments 170 may each define the same fiber orientation angle (α) which may be about +10 to +80° (e.g., +45°).

Each fabric segment of plurality of fabric segments 170 may define any suitable arc angle (φ). In some examples, each respective fabric segment 170 defines the same arc angle (φ), for example, in a range from about 65° to about 70° (e.g., about) 68°. In some such examples, each fibrous layer 162 may include a total of six fabric segments 170. By setting the arc angles (φ) to a value of about 65° to about 70°, associated butt joints 180 between abutting edges 182 of sequentially laid fabric segments 170 may be dispersed so that respective butt joints 180 do not axially align between neighboring fibrous layers (for example, between fibrous layer 162 and a second fibrous layer neighboring fibrous layer 162), thereby improving the strength of fibrous preform 160. It will be understood that in the example described, fibrous layer 162 completes more than one revolution relative to a central axis 184 of fibrous preform 160 within a helical arrangement of fibrous layers. First fibrous layer 162 is also referred to as first fibrous layer 162A herein.

Figure 6B:
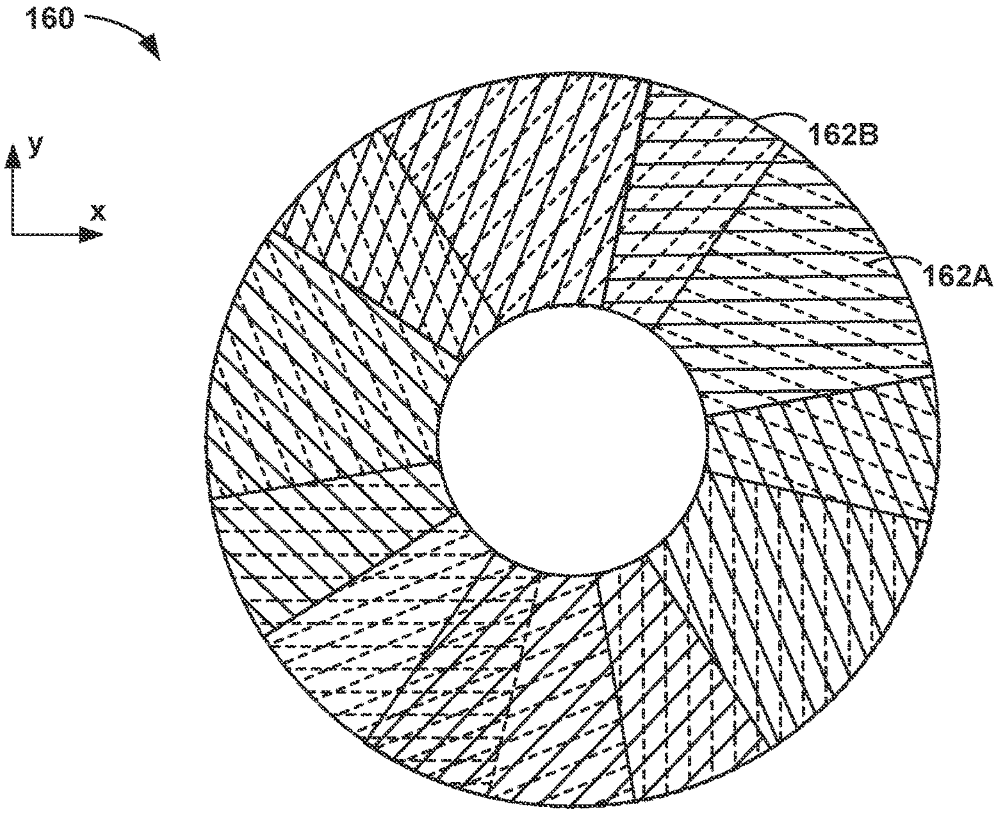
FIG. 6B is a schematic top view of the preform of FIG. 6A in the partially formed configuration further including a second fibrous layer including a plurality of fabric segments having the positive fiber orientation angle.

FIG. 6B is a schematic top view of the preform of FIG. 6A in the partially formed configuration further including a second fibrous layer 162B including a plurality of fabric segments 170 having the positive fiber orientation angle. Second fibrous layer 162B is laid over first fibrous layer 162A (shown in dashed lines). Each of first fibrous layer 162A and second fibrous layer 162B include fabric segments 170 having the same fiber orientation angle (α).

Further fibrous layers may be successively laid on second fibrous layer 162B. Thus, preform 160 may include a plurality of fibrous layers (including first fibrous layer 162A and second fibrous layer 162B) each including fabric segments having the same fiber orientation angle (α) (also referred to as the positive fiber orientation angle). The plurality of fibrous layers may be stacked in an annular arrangement.

Figure 6C:
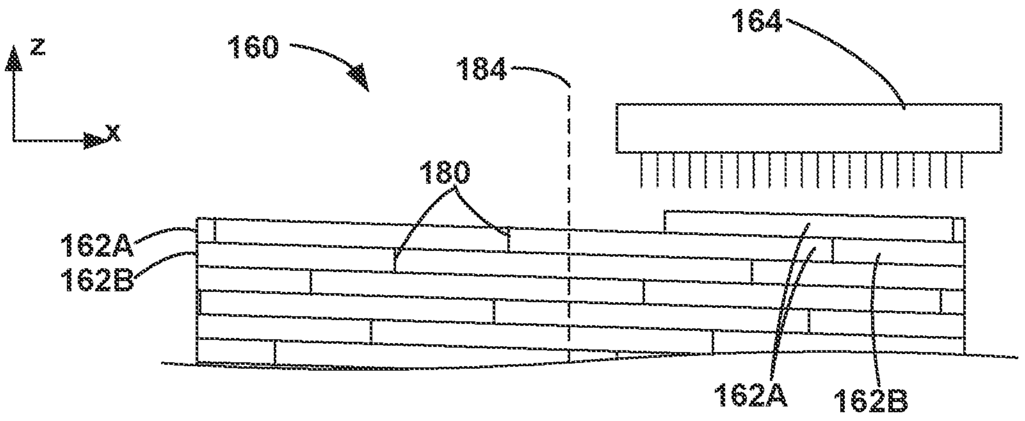
FIG. 6C is schematic side view of the preform of FIG. 6A that may be used to manufacture a densified carbon-carbon composite disc brake.

FIG. 6C is schematic side view of the example fibrous preform 160 that may be used to manufacture a densified carbon-carbon composite disc brake (e.g., stator or rotor disc brakes 36 and 38). Fibrous preform 160 includes a plurality of superposed fibrous layers 162 that are stacked and consolidated together using a needling device 164 to produce a plurality of needled fibers (not shown) that extend into more than one fibrous layer 162. Each fibrous layer 162 may be formed by a plurality of fabric segments 170 that are helically aligned and superposed over previously formed fibrous layers 162 (e.g., a first fibrous layer 162A is positioned on a second fibrous layer 162B).

Once fibrous preform 160B has been fully formed to a desired thickness (T), the preform may be subjected to one or more pyrolyzation and densification cycles. For example, fibrous preform 160B may be initially pyrolyzed (e.g., carbonized) to convert any carbon-precursor materials into carbon. Fibrous preform 160B may then be subjected to one or more densification cycles such as chemical vapor deposition/chemical vapor infiltration (CVD/CVI), vacuum/pressure infiltration (VPI), or resin transfer molding (RTM), followed by subsequent pyrolyzation or heat treatment cycles to infiltrate the porous preform with carbon matrix material.

A densified carbon-carbon composite material may be formed by densifying preform 160. For example, preform 160 may include reinforcing carbon fibers, and preform 160 may be carbonized and/or densified to form a carbon-carbon composite. The preform 160 may be formed by densification in presence of a load, or in absence of a load, as described elsewhere in the present disclosure. In some examples, a brake may include the densified carbon-carbon composite material.

In some examples, different fibrous layers 162 within fibrous preform 160 may include respective fabric segments 170 that define different fiber orientation angles (α) relative to the different fibrous layers 162. For example, some fibrous layers 162 may differ in one or both of magnitude or sign of the fiber orientation angle. In some examples, a first sub-plurality of fibrous layers 162 include first fabric segments having negative fiber orientation angles (−α), and a second sub-plurality of fibrous layers 162 include second fabric segments having positive fiber orientation angle (+a). In some examples, arranging the fiber orientation angles (α) between some fibrous layers to differ from one another (for example, in sign or magnitude) may help to improve the overall strength of a resultant composite formed from preform 160.

Figure 7A:
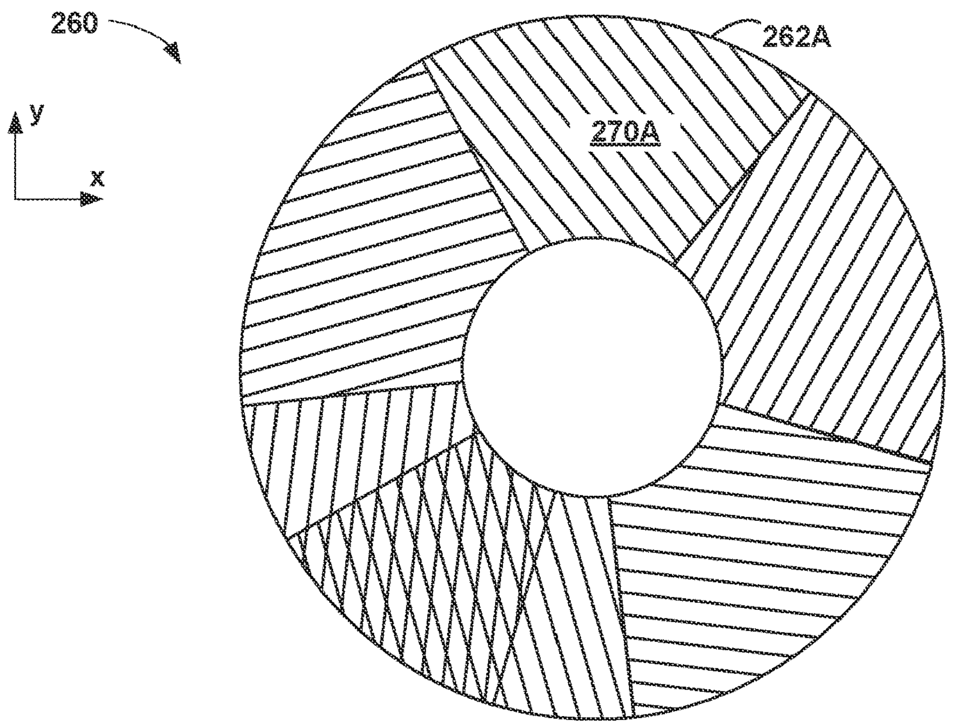
FIG. 7A is a schematic top view of an example preform in a partially formed configuration including a first fibrous layer including a plurality of fabric segments having a negative fiber orientation angle.

FIG. 7A is a schematic top view of an example preform 260 in a partially formed configuration including a first fibrous layer 260A including a plurality of fabric segments 270A having a negative fiber orientation angle (−α). Preform 260 is substantially similar to preform 160 described with reference to FIG. 6A, but differs in the orientation of fibers in fabric segments 270A compared to fabric segments 170 of FIG. 6A. In particular, the magnitude of the negative fiber orientation angle (−α) of fibers in fabric segments 270A is the same as that of the positive fiber orientation angle (+α) of fibers in fabric segments 170, but differing in sign (or being a mirror image).

Figure 7B:
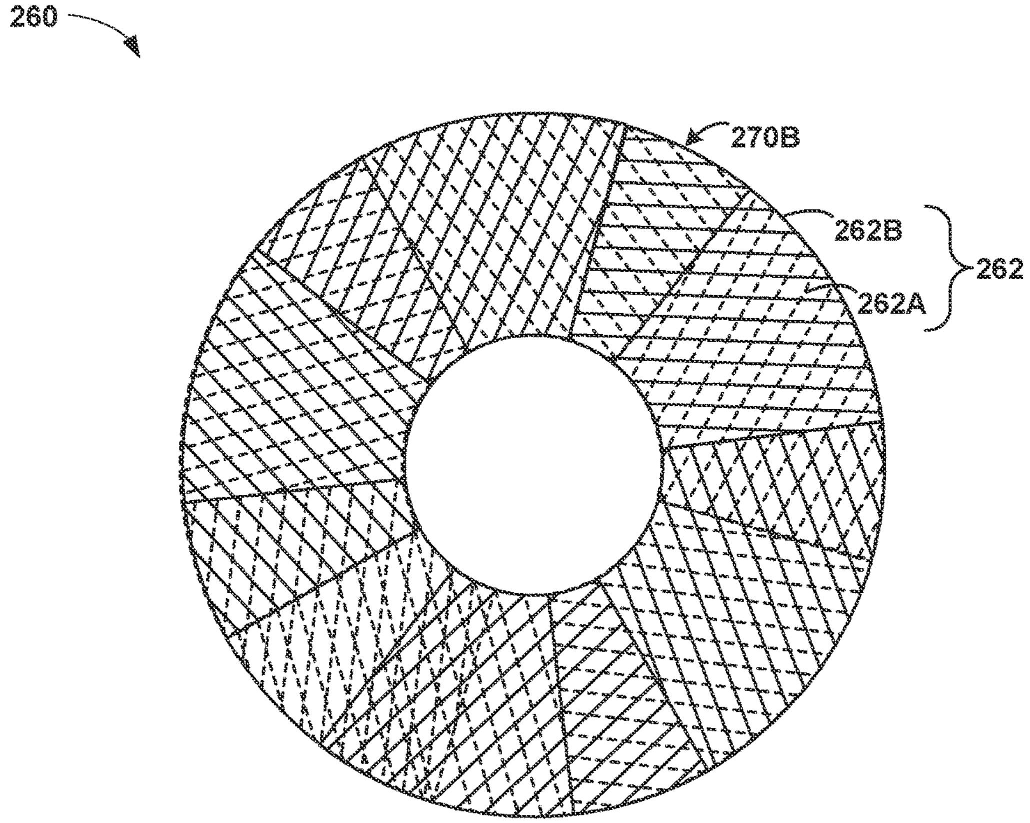
FIG. 7B is a schematic top view of the partially formed preform of FIG. 7A in the partially formed configuration further including a second fibrous layer including a plurality of fabric segments having the positive fiber orientation angle.

FIG. 7B is a schematic top view of the preform 260 of FIG. 7A in the partially formed configuration further including a second fibrous layer 262B including a plurality of fabric segments 270B having the positive fiber orientation angle (+α). Thus, second fibrous layer 262B is laid over first fibrous layer 262A (shown in dashed lines).

Further fibrous layers may be successively laid on second fibrous layer 262B. Thus, preform 260 may include a plurality of fibrous layers (including first fibrous layer 262A and second fibrous layer 262B) each including fabric segments having the different fiber orientation angles (+α and −α) (also referred to as the positive fiber orientation angle and the negative fiber orientation angle respectively).

In some examples, preform 260 includes a plurality of fibrous layers 262 consolidated together and forming preform 260 extending along a longitudinal axis (for example, normal to the x-y plane). The plurality of fibrous layers 262 include at least one first fibrous layer 262A and at least one second fibrous layer 262B. The at least one first fibrous layer 262A may include a plurality of first segments 270A, and the least one second fibrous layer 262B may include a plurality of second segments 270B. At least one first segment of the plurality of first segments 270A includes a plurality of reinforcing fibers extending at an angle −α relative to a radial direction extending from the longitudinal axis. At least one second segment of the plurality of second segments 270B includes a plurality of reinforcing fibers extending at an angle +α relative to the radial direction. α is greater than 0° and less than 90°.

Alternating layers in preform 260 may form a 1:1 or AB pattern, where A represents layers including fabric segments having the negative fiber orientation angle, and where B represents layers including fabric segments having the positive fiber orientation angle (or vice versa). However, layers may be laid up in different patterns, for example, as described with reference to FIGS. 8A to 8C.

Figure 8A:
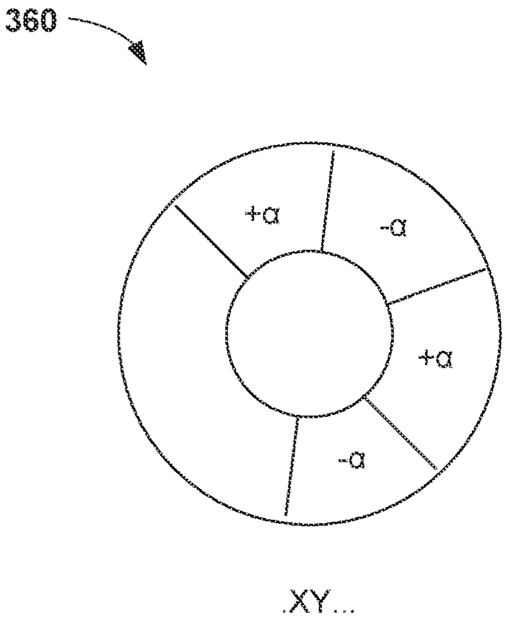
FIG. 8A is a schematic partial side view of an example preform including fibrous layers including pluralities of fabric segments having negative and positive fiber orientation angles in an XY segment pattern.

FIG. 8A is a schematic partial side view of an example preform 360 including fibrous layers including pluralities of fabric segments having negative and positive fiber orientation angles in an XY segment pattern. One or both of the top-most fibrous layer or the bottom-most fibrous layer in preform 360 may include fabric segments in either the negative fiber orientation angle (−α) or the positive fiber orientation angle (+α). Thus, preform 360 includes a plurality of fibrous layers including an XY (1:1) segment pattern. The XY segment pattern includes alternating segments for example, at least one first fabric segment having fiber orientation angle −α and at least one second fabric segment having fiber orientation angle −α.

Figure 8B:
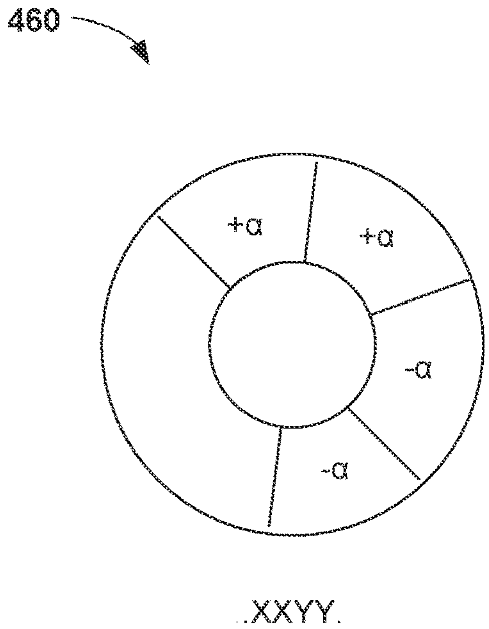
FIG. 8B is a schematic partial side view of an example preform including fibrous layers including pluralities of fabric segments having negative and positive fiber orientation angles in an XXYY segment pattern.

FIG. 8B is a schematic partial side view of an example preform 460 including fibrous layers including pluralities of fabric segments having negative and positive fiber orientation angles in an XXYY segment pattern. One or more of the top-most fibrous layers or the bottom-most fibrous layers in preform 360 may include fabric segments in either the negative fiber orientation angle (−α) or the positive fiber orientation angle (+α).

Figure 8C:
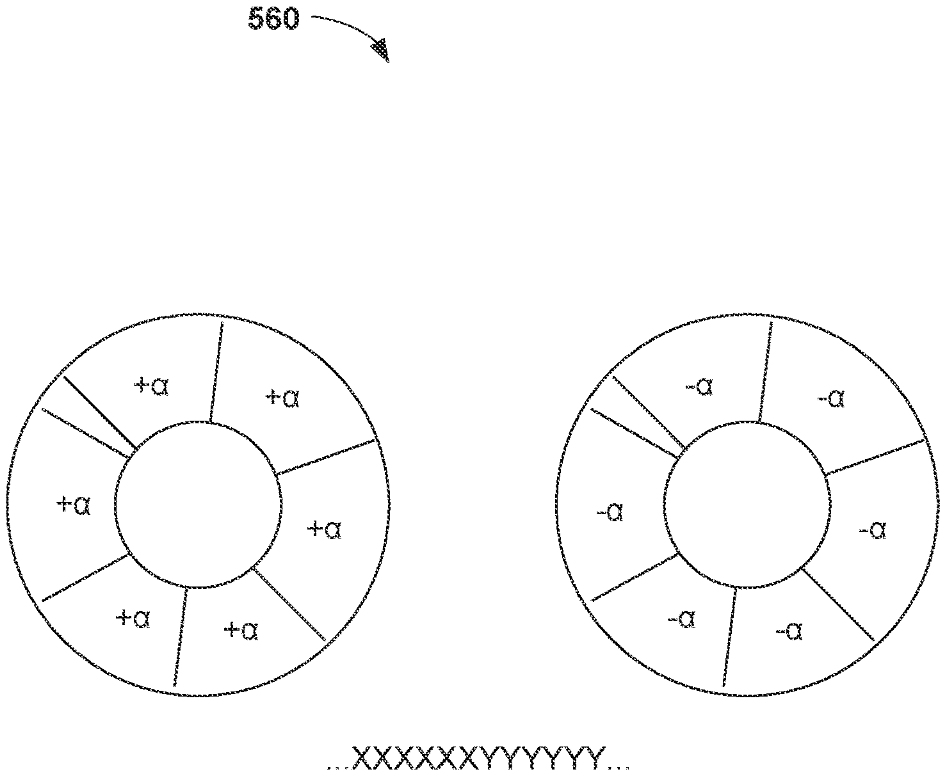
FIG. 8C is a schematic partial side view of an example preform including fibrous layers including pluralities of fabric segments having negative and positive fiber orientation angles in an XXXXXXYYYYYY segment pattern.

FIG. 8C is a schematic partial side view of an example preform 560 including fibrous layers including pluralities of fabric segments having negative and positive fiber orientation angles in an XXXXXXYYYYYY segment pattern. One or more of the top-most fibrous layers or the bottom-most fibrous layers in preform 360 may include fabric segments in either the negative fiber orientation angle (−α) or the positive fiber orientation angle (+α).

While segments patterns such as XY (1:1), XXYY (2:2), and XXXXXXYYYYYY (6:6) have been described, segments may extend in any combinations of numbers of X and Y segments. For example, 1:2, 2:1, 3:1, 1:3, 3:2, 2:3, . . . , m:n, for any combination of m and n, where m and n are positive integers. Further, preforms may include layers in a single pattern, or in combinations of patterns. For example, a portion of, or an entirety of, a preform may include segments in same or different segment patterns. For example, a first portion of a preform may include segments in an XY segment pattern, while a second portion of the preform may include segments in an XXXXXX:YYYYYY segment pattern. The arrangement of segments patterns may be symmetric, asymmetric, periodic, or periodic in sections. In some examples, the fibers may be in randomized patterns, but including a predetermined fraction of segments of type X compared to type Y. Respective neighboring layers or segments may be in direct contact.

Further, while segment layup patterns have been described with reference to two segment types (X and Y), more than two types of segments may be present. For example, additional types of segments (T, V, W, and so on) may be present, differing in one or both of magnitude of sign or angle. In some examples, segment layup patterns may include at least one first fabric segment including radial fiber orientation or tangential fiber orientation, and at least one second fabric segment including a non-radial and non-tangential fiber orientation. Moreover, segments X and Y (or other segments) may differ (i) only in magnitude, but not in sign, (ii) only in sign, but not magnitude, or (iii) both in magnitude or sign.

After a preform is formed, for example, preform 100, preform 160, or any other preform according to the present disclosure, the preform may be carbonized and/or densified to form a composite.

Figure 9A:
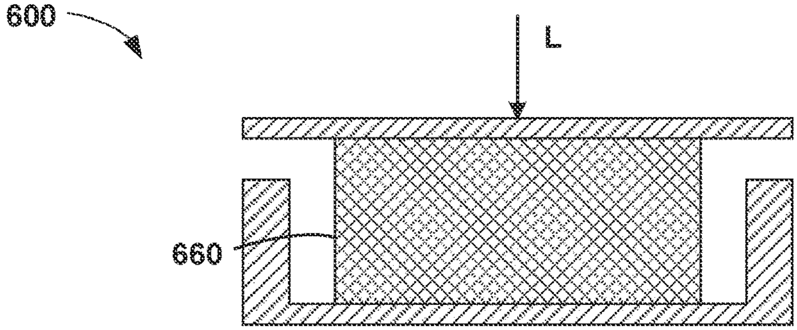
FIG. 9A is a schematic cross-sectional view of a constrained carbonization assembly in an initial configuration with a load applied to a preform prior to thermal treatment.
Figure 9B:
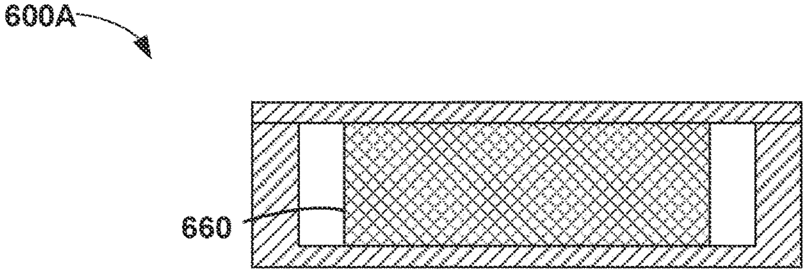
FIG. 9B is a schematic cross-sectional view of the constrained carbonization assembly of FIG. 9A in an intermediate configuration during carbonization under load.
Figure 9C:
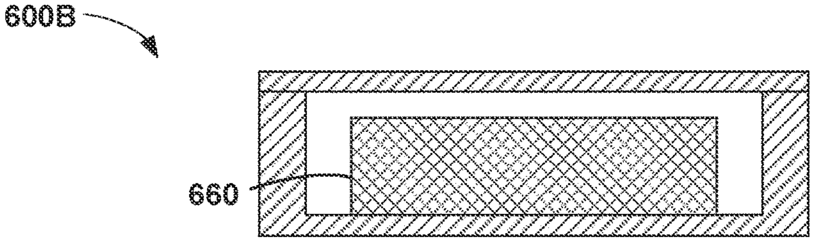
FIG. 9C is a schematic cross-sectional view of the constrained carbonization assembly of FIG. 9A in a final configuration after carbonization under load.

FIG. 9A is a schematic cross-sectional view of a constrained carbonization assembly 600 in an initial configuration with a load L applied to a preform 660 prior to thermal treatment. Load L is applied continuously during carbonization until a predetermined change in geometry. Preform 660 deforms in response to the load and geometric changes in response to the thermal treatment. FIG. 9B is a schematic cross-sectional view of the constrained carbonization assembly of FIG. 9A in an intermediate configuration 600A during carbonization under load L. FIG. 9C is a schematic cross-sectional view of the constrained carbonization assembly of FIG. 9A in a final configuration 600B after carbonization under load L. After further continued treatment, preform 660 may shrink further to a final height, as seen in FIG. 9C.

While load may be applied during carbonization as described with reference to FIGS. 9A to 9C, in other examples, carbonization may be performed in absence of a load.

Figure 10A:
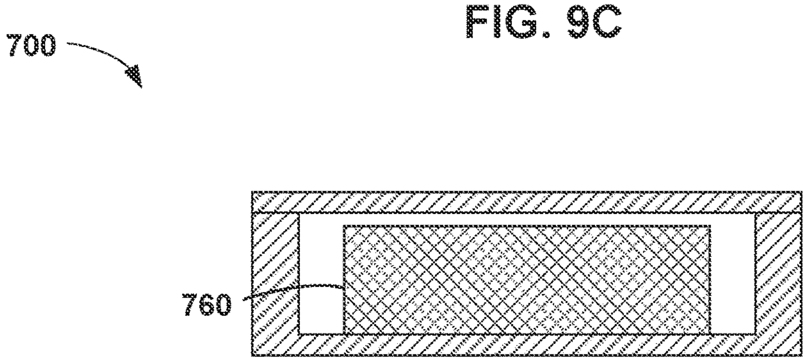
FIG. 10A is a schematic cross-sectional view of an unconstrained carbonization assembly in an initial configuration with no load applied to a preform prior to thermal treatment.
Figure 10B:
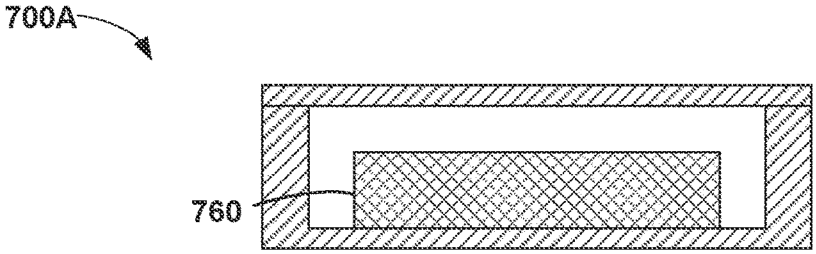
FIG. 10B is a schematic cross-sectional view of the unconstrained carbonization assembly of FIG. 10A in a final configuration after carbonization without load.

FIG. 10A is a schematic cross-sectional view of an unconstrained carbonization assembly 700 in an initial configuration with no load applied to a preform 760 prior to thermal treatment. FIG. 10B is a schematic cross-sectional view of the unconstrained carbonization assembly of FIG. 10A in a final configuration 700A after carbonization without load. Preform 760 shrinks to a final height in response to thermal treatment. Carbonization in absence of a load may allow fibers within preform 760 to exhibit self-controlled or free thermal shrinkages, which may result in lower fiber volume fractions (FVF) of the resultant composite material. In turn, a lower $B_{eff}$, lower thermal stress residues in the carbonized materials, lower distortions, and higher braking clearance during the braking may be achieved.

Figure 11:
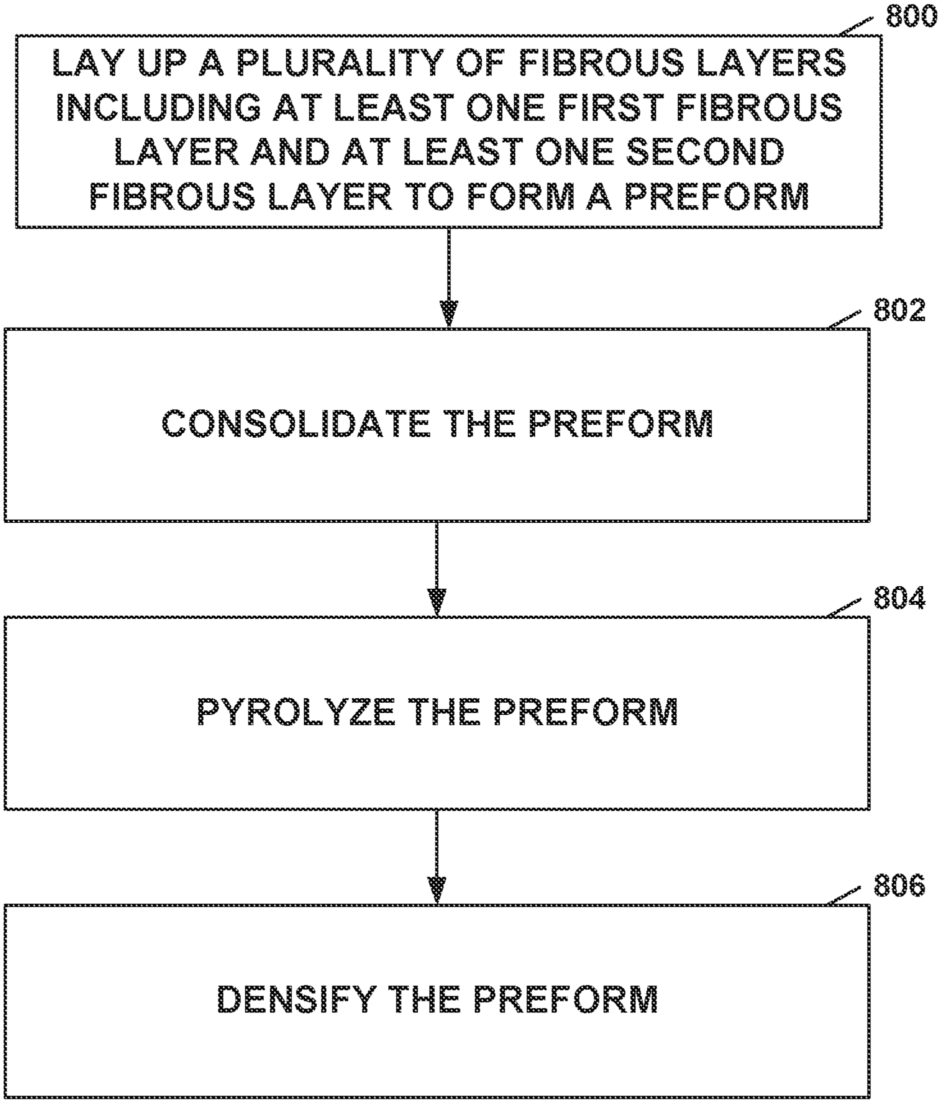
FIG. 11 is a flow diagram illustrating an example technique for forming an example preform.

The fibrous preforms described herein may be formed using any suitable technique. FIG. 11 is a flow diagram illustrating an example technique of manufacturing a fibrous preform. For ease of illustration, the example method of FIG. 11 is described primarily with respect to fibrous preform 260; however, other fibrous preforms may be formed using the described techniques and fibrous preforms described with reference to FIGS. 3 to 8C may be made using other techniques.

In some examples, the disclosure describes a method including laying up a plurality of layers 262 including at least one first fibrous layer 262A and at least one second fibrous layer 262B to form preform 260 extending along a longitudinal axis (800). The at least one first fibrous layer 262A includes a plurality of first segments 270A, and the least one second fibrous layer 262B includes a plurality of second segments 270B. The method further includes consolidating preform 260 (802). The consolidating (802) may include, for example, needle punching or stitching or tufting plurality of layers 262. At least one first segment of the plurality of first segments 270A includes a plurality of reinforcing fibers extending at an angle $-\alpha$ relative to a radial direction extending from the longitudinal axis. At least one second segment of the plurality of second segments 270B includes a plurality of reinforcing fibers extending at an angle $+\alpha$ relative to the radial direction. $\alpha$ is greater than 0° and less than 90°.

The laying up (800) may include superposing (e.g., helically stacking) and needle-punching a plurality of fabric segments 270A and 270B to produce a plurality of fibrous layers 262A and 262B consolidated together to form fibrous preform 260B in the shape of an annulus. The plurality of fibrous layers 262A and 2662B may be stacked in an annular arrangement.

The technique may further include pyrolyzing fibrous preform 260 (804); and densifying the resultant preform 260 (806).

As described above, each fibrous layer 262 may include a respective plurality of fabric segments 270A or 270B, which may be sequentially added in by stacking the plurality of fabric segments to form a helix. In some examples, each fibrous layer 262 may complete about 0.9 to about 1.2 revolutions of the helix such that butt joints 182 between abutting edges 180 do not radially overlap between adjacent fibrous layers 262.

Each fabric segment or set of fabric segments may be consolidated (for example, needle-punched or stitched and tufted) after being added to fibrous preform 260. In some examples, the fabric segments may be consolidated into preform 260 on a layer-by-layer basis. Additionally, or alternatively, more than one fibrous layers 262 may be added to preform 260 and then the collective superposed layers 262 may be consolidated. The entire process may then continue until the desired preform thickness (T) is obtained.

Once fibrous preform 260 has been formed, fibrous preform 260 may be pyrolyzed (804) to convert any carbon-precursor material into carbon through a thermal degradation process to effectively burn off any non-carbon material. For example, fibrous preform 260 may be carbonized by heating fibrous preform 260 in a retort under inert or reducing conditions to remove the non-carbon constituents (hydrogen, nitrogen, oxygen, etc.) from fibers 120 and/or needled fibers 104. The carbonization can be carried out using retort, such as an autoclave, a furnace, a hot isostatic press, a uniaxial hot press, or the like. In each of these techniques, fibrous preform 260 may be heated in the inert atmosphere at a temperature in the range of about 600° C. to about 1000° C. while optionally being mechanically compressed. The mechanical compression may be used to define the geometry (e.g., thickness (T)) of fibrous preform 260. In other examples, no mechanical compression or load is applied. Thus, in some examples, one or both of carbonizing or the densifying (806) of preform 260 is performed in an absence of a load or a constraint on the preform 260.

In some examples, the retort may be purged gently with nitrogen for approximately 1 hour, then slowly heated to about 900° C. over the course of approximately 10-20 hours, followed by elevating the temperature to about 1050° C. over approximately 1-2 hours. The retort then may be held at about 1050° C. for approximately 3-6 hours before the carbonized preform is allowed to cool overnight. In some examples, the carbonization step can be carried out at even higher temperature, including up to about 1800° C. or up to about 2600° C.

After carbonization, fibrous preform 260 may be subjected to one or more densification cycles to form a composite (806). Example densification cycles may include, for example, being densified by applying one or more cycles of CVI/CVD of a carbonaceous gas. Any suitable carbonaceous gas may be used during the CVI/CVD processing including, for example, carbon-based gases such as natural gas, methane, ethane, propane, butane, propylene, or acetylene, or a combination of at least two of these gases. In some examples, the application of the carbonaceous gas to densify a fibrous preform 260 via CVI/CVD may occur substantially in a vacuum space (e.g., a vessel with an internal environment at less than 100 Torr) or under an inert gas environment so as to control the chemical deposition reaction. In some examples, during application of the CVI/CVD gas, the environment including fibrous preform 260 may be heated to an elevated temperature, for example about 900° C. to about 1200° C., to promote the chemical deposition reaction.

In other examples, fibrous preform 260 may be densified (806) using other suitable techniques including for example, resin infiltration and carbonization via resin transfer mold (RTM) processing, vacuum pressure infiltration (VPI) processing, high pressure infiltration (HPI), or the like. In some examples, the densification step (806) may produce a densified composite substrate having a final density of about 1.65 to about 1.95 g/cc.

In some examples, during or after the densification of fibrous preform 260, the major friction surfaces of the resultant composite may be sculpted into a desired shape, such as a final brake disc shape. For example, composite substrate may be ground in the shape of a densified composite disc brake having a final thickness T (e.g., about 1.4 inches (35.56 mm)). Additionally, or alternatively, lug notches 72 may be formed at this time.

EXAMPLES

Example 1

Slot pull tests were conducted on a baseline preform size, a 6:6 radial/chordal (R/C) preform, a 6:6±45° preform, a 1:1±45° preform, and a 1:1 radial/chordal preform. The results are shown in TABLE 1.

TABLE 1

| Preform | Ratio of slot pull strength |
|---|---|
| Baseline | 1.00 |
| 6:6 R/C | 1.22 |
| 6:6 ± 45° | 1.29 |
| 1:1 ± 45° | 1.36 |
| 1:1 R/C | 1.37 |

Example 2

Figure 12:
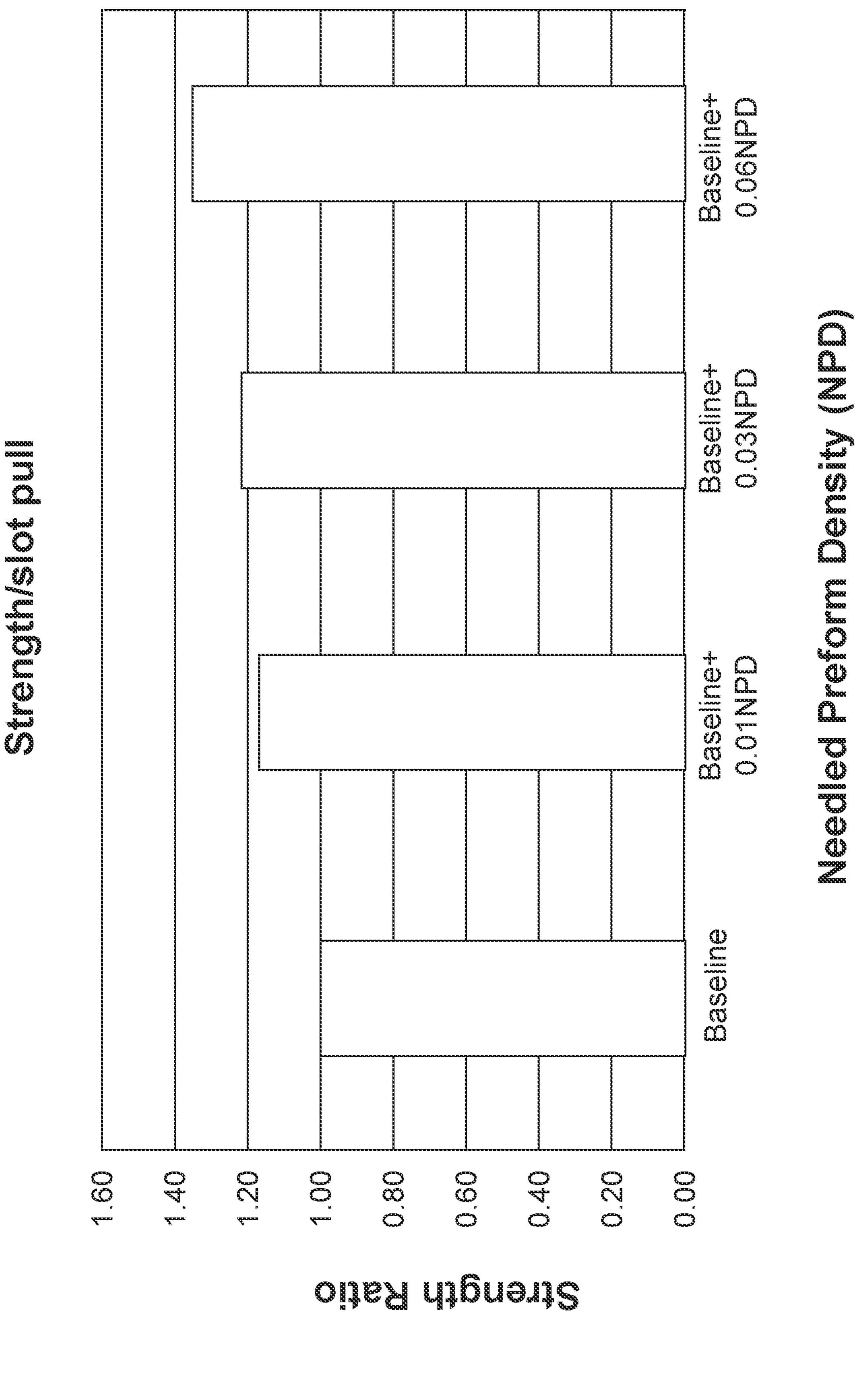
FIG. 12 is a chart representing a relationship between slot pull strength and needle punch density.

Slot pull tests were performed on a baseline preform, and with increasing needle punch density. FIG. 12 is a chart representing a relationship between slot pull strength and needle punch density. As seen in FIG. 12, slot pull strength increased when needle punch density was increased.

The following clauses illustrate example subject matter described herein.

Clause 1: A preform for a composite, the preform including:

a plurality of fibrous layers consolidated together and forming the preform extending along a longitudinal axis, the plurality of fibrous layers including at least one first fibrous layer and at least one second fibrous layer, the at least one first fibrous layer including a plurality of first segments, the least one second fibrous layer including a plurality of second segments, where at least one first segment of the plurality of first segments includes a plurality of reinforcing fibers extending at an angle $-\alpha$ relative to a radial direction extending from the longitudinal axis, where at least one second segment of the plurality of second segments includes a plurality of reinforcing fibers extending at an angle $+\alpha$ relative to the radial direction, and where $\alpha$ is greater than 0° and less than 90°.

Clause 2: The preform of clause 1, where the plurality of fibrous layers are stacked in an annular arrangement.

Clause 3: The preform of any of clauses 1 or 2, where the reinforcing fibers include one or more of carbon, a carbon precursor, boron, or silica.

Clause 4: The preform of clause 3, where the carbon precursor includes an aromatic species.

Clause 5: The preform of any of clauses 1 to 4, where the plurality of fibrous layers includes an XY (1:1) segment pattern of the at least one first segment and the at least one second segment.

Clause 6: The preform of any of clauses 1 to 4, where the plurality of fibrous layers includes an XXYY (2:2) segment pattern of the at least one first segment and the at least one second segment.

Clause 7: The preform of any of clauses 1 to 4, where the plurality of fibrous layers includes an XXXXXXYYYYYY (6:6) segment pattern of the at least one first segment and the at least one second fibrous segment.

Clause 8: The preform of any of clauses 1 to 7, where respective neighboring layers of the plurality of fibrous layers are in direct contact.

Clause 9: The preform of any of clauses 1 to 8, where a is 45°.

Clause 10: The preform of any of clauses 1 to 8, where a is 60°.

Clause 11: The preform of any of clauses 1 to 10, where each layer of the plurality of fibrous layers has a uniform density in a radial direction.

Clause 12: The preform of any of clauses 1 to 11, where each layer of the plurality of fibrous layers has a uniform thermal conductivity in a radial direction.

Clause 13: A densified carbon-carbon composite material formed by densifying the preform of any of clauses 1 to 12.

Clause 14: The carbon-carbon composite material of clause 13, where the densifying the preform is performed in an absence of a load or a constraint on the preform.

Clause 15: A brake disc including the densified carbon-carbon composite material of clause 13.

Clause 16: A method including:

laying up a plurality of layers including at least one first fibrous layer and at least one second fibrous layer to form a preform extending along a longitudinal axis, the at least one first fibrous layer including a plurality of first segments, the least one second fibrous layer including a plurality of second segments; and consolidating the preform, where at least one first segment of the plurality of first segments includes a plurality of reinforcing fibers extending at an angle $-\alpha$ relative to a radial direction extending from the longitudinal axis, where at least one second segment of the plurality of second segments includes a plurality of reinforcing fibers extending at an angle $+\alpha$ relative to the radial direction, and where $\alpha$ is greater than 0° and less than 90°.

Clause 17: The method of clause 16, where the laying up the plurality of fibrous layers includes stacking the plurality of fibrous layers in an annular arrangement.

Clause 18: The method of any of clauses 16 or 17, where the reinforcing fibers include one or more of carbon, a carbon precursor, boron, or silica.

Clause 19: The method of clause 18, where the carbon precursor includes an aromatic species.

Clause 20: The method of any of clauses 16 to 19, where the plurality of fibrous layers includes an XY (1:1) segment pattern of the at least one first segment and the at least one second segment.

Clause 21: The method of any of clauses 16 to 19, where the plurality of fibrous layers includes an XXYY (2:2) segment pattern of the at least one first segment and the at least one second segment.

Clause 22: The method of any of clauses 16 to 19, where the plurality of fibrous layers includes an XXXXXXYYYYYY (6:6) segment pattern of the at least one first segment and the at least one second fibrous segment.

Clause 23: The method of any of clauses 16 to 22, where respective neighboring fibrous layers of the plurality of fibrous layers are in direct contact.

Clause 24: The method of any of clauses 16 to 23, where a is 45°.

Clause 25: The method of any of clauses 16 to 23, where a is 60°.

Clause 26: The method of any of clauses 16 to 25, further including:

carbonizing the preform to form a carbonized preform; and densifying the carbonized preform to form a densified composite material.

Clause 27: The method of clause 26, where the carbonizing or the densifying the preform is performed in an absence of a compressive load or on the preform.

Clause 28: The method of clause 26, further including terminating the densifying at a predetermined fiber volume fraction or a predetermined pore size distribution of the preform.

Clause 29: The method of clause 26, further including forming a brake including the preform.

Clause 30: The method of any of clauses 16 to 29, further including compressing the preform.

Clause 31: The method of any of clauses 16 to 30, where each layer of the plurality of fibrous layers has a uniform density in a radial direction.

Clause 32: The method of any of clauses 16 to 31, where each layer of the plurality of fibrous layers has a uniform thermal conductivity in a radial direction.

Various examples have been described. These and other examples are within the scope of the following claims.

What is claimed is:

1. A preform for a composite, the preform comprising:

a plurality of fibrous layers consolidated together and forming the preform extending along a longitudinal axis, the plurality of fibrous layers comprising at least one first fibrous layer and at least one second fibrous layer, the at least one first fibrous layer comprising a plurality of first segments, the least one second fibrous layer comprising a plurality of second segments, wherein at least one first segment of the plurality of first segments comprises a plurality of reinforcing fibers extending at an angle $-\alpha$ relative to a radial direction extending from the longitudinal axis, wherein at least one second segment of the plurality of second segments comprises a plurality of reinforcing fibers extending at an angle $+\alpha$ relative to the radial direction, wherein $\alpha$ is greater than 0° and less than 90°, and wherein the plurality of fibrous layers comprises at least one of:

an XY (1:1) segment pattern of the at least one first segment and the at least one second segment, an XXYY (2:2) segment pattern of the at least one first segment and the at least one second segment, or an XXXXXXYYYYYY (6:6) segment pattern of the at least one first segment and the at least one second segment.

2. The preform of claim 1, wherein the plurality of fibrous layers are stacked in an annular arrangement.

3. The preform of claim 1, wherein the reinforcing fibers comprise one or more of carbon, a carbon precursor, boron, or silica.

4. The preform of claim 1, wherein the plurality of fibrous layers comprises the XY (1:1) segment pattern of the at least one first segment and the at least one second segment.

5. The preform of claim 1, wherein the plurality of fibrous layers comprises the XXXXXXYYYYYY (6:6) segment pattern of the at least one first segment and the at least one second segment.

6. The preform of claim 1, wherein respective neighboring fibrous layers of the plurality of fibrous layers are in direct contact.

7. The preform of claim 1, wherein $\alpha$ is 45° or 60°.

8. The preform of claim 1, wherein each layer of the plurality of fibrous layers has one or both of a uniform density or a uniform thermal conductivity in a radial direction.

9. A densified carbon-carbon composite material formed by densifying the preform of claim 1.

10. A brake disc comprising the densified carbon-carbon composite material of claim 9.

11. A method comprising:

laying up a plurality of fibrous layers comprising at least one first fibrous layer and at least one second fibrous layer to form a preform extending along a longitudinal axis, the at least one first fibrous layer comprising a plurality of first segments, the least one second fibrous layer comprising a plurality of second segments; and consolidating the preform, wherein at least one first segment of the plurality of first segments comprises a plurality of reinforcing fibers extending at an angle $-\alpha$ relative to a radial direction extending from the longitudinal axis, wherein at least one second segment of the plurality of second segments comprises a plurality of reinforcing fibers extending at an angle $+\alpha$ relative to the radial direction, wherein $\alpha$ is greater than 0° and less than 90°, and wherein the plurality of fibrous layers comprises at least one of:

an XY (1:1) segment pattern of the at least one first segment and the at least one second segment, an XXYY (2:2) segment pattern of the at least one first segment and the at least one second segment, or an XXXXXXYYYYYY (6:6) segment pattern of the at least one first segment and the at least one second segment.

12. The method of claim 11, wherein the laying up the plurality of fibrous layers comprises stacking the plurality of fibrous layers in an annular arrangement.

13. The method of claim 11, wherein the reinforcing fibers comprise one or more of carbon, a carbon precursor, boron, or silica.

14. The method of claim 13, wherein the plurality of fibrous layers comprises the XY (1:1) segment pattern of the at least one first segment and the at least one second segment.

15. The method of claim 11, wherein the plurality of fibrous layers comprises the XXXXXXYYYYYY (6:6) segment pattern of the at least one first segment and the at least one second segment.

16. The method of claim 11, wherein respective neighboring fibrous layers of the plurality of fibrous layers are in direct contact.

17. The method of claim 11, wherein α is 45° or 60°.

18. The method of claim 11, further comprising:

carbonizing the preform to form a carbonized preform; and densifying the carbonized preform to form a densified composite material.

19. The method of claim 18, wherein the densifying the preform is performed in an absence of a compressive load on the preform.

20. The method of claim 18, further comprising forming a brake comprising the densified composite material.

* * * * *